(12) United States Patent
Welte et al.

(10) Patent No.: US 11,718,489 B2
(45) Date of Patent: Aug. 8, 2023

(54) CROP INPUT SUPPLY SYSTEM, METHODS AND APPARATUS

(71) Applicant: 360 Yield Center, LLC, Morton, IL (US)

(72) Inventors: Jonathan T. Welte, Delavan, IL (US); Nowell Moore, Congerville, IL (US)

(73) Assignee: 360 Yield Center, LLC, Morton, IL (US)

( * ) Notice: Subject to any disclaimer, the term of this patent is extended or adjusted under 35 U.S.C. 154(b) by 205 days.

(21) Appl. No.: 16/626,045

(22) PCT Filed: Jun. 25, 2018

(86) PCT No.: PCT/US2018/039372
§ 371 (c)(1),
(2) Date: Dec. 23, 2019

(87) PCT Pub. No.: WO2018/237401
PCT Pub. Date: Dec. 27, 2018

(65) Prior Publication Data
US 2020/0216275 A1 Jul. 9, 2020

Related U.S. Application Data

(60) Provisional application No. 62/617,454, filed on Jan. 15, 2018, provisional application No. 62/548,253, (Continued)

(51) Int. Cl.
*B65G 67/04* (2006.01)
*A01C 15/00* (2006.01)

(52) U.S. Cl.
CPC ............ *B65G 67/04* (2013.01); *A01C 15/006* (2013.01); *B65G 2201/04* (2013.01)

(58) Field of Classification Search
CPC ............... B65G 67/04; B65G 2201/04; B65G 69/0458; A01C 15/006; A01C 23/047; A01C 23/003; A01C 23/008
See application file for complete search history.

(56) References Cited

U.S. PATENT DOCUMENTS 3,620,268 A * 11/1971 Paddington ............. B67D 9/02
141/279
4,007,765 A 2/1977 Bellows
(Continued)

OTHER PUBLICATIONS

International Search Report, Application No. PCT/US2018/039372, dated Sep. 24, 2018, 2 pages.
(Continued)

*Primary Examiner* — Timothy L Maust
(74) *Attorney, Agent, or Firm* — Thomas J. Oppold; Larkin Hoffman Daly & Lindgren, Ltd.

(57) ABSTRACT

A crop input transfer system for transferring a crop input to an implement tank supported on an implement dispensing the crop input, the crop input transfer system includes a mobile supply vehicle powered independent of the implement. The mobile supply vehicle has a boom and a supply tank holding a crop input supply. The crop transfer system includes a coupler with a first coupler portion that matingly couples with a second coupler portion. The first coupler portion is mounted to the boom and the second coupler portion is mounted to the implement. The crop input supply in the supply tank is communicated to implement tank via the matingly coupled first and second coupler portions.

24 Claims, 33 Drawing Sheets

Related U.S. Application Data filed on Aug. 21, 2017, provisional application No. 62/523,860, filed on Jun. 23, 2017.

(56) References Cited

U.S. PATENT DOCUMENTS

| | | | |
|---|---|---|---|
| 4,023,518 A | 5/1977 | Fahrner | |
| 4,408,943 A * | 10/1983 | McTamaney | F16L 27/0861 |
| | | | 137/554 |
| 4,483,376 A | 11/1984 | Bresie | |
| 4,998,560 A * | 3/1991 | Le Devehat | B67D 7/3218 |
| | | | 137/616 |
| 5,291,922 A | 3/1994 | Martin | |
| 5,368,232 A * | 11/1994 | Schroeder | E01C 23/222 |
| | | | 239/150 |
| 6,000,428 A | 12/1999 | Berberat | |
| 6,375,123 B1 | 4/2002 | Greenhalgh | |
| 7,300,004 B2 * | 11/2007 | Sinden | A01G 25/097 |
| | | | 239/722 |
| 8,402,746 B2 * | 3/2013 | Powell | B08B 15/00 |
| | | | 60/284 |
| 9,265,187 B2 * | 2/2016 | Cavender-Bares | A01C 21/002 |
| 9,296,604 B2 * | 3/2016 | Ballu | A01M 7/0085 |
| 9,708,040 B2 * | 7/2017 | Le Devehat | B63B 27/24 |
| 2004/0084551 A1 | 5/2004 | Vickers et al. | |
| 2010/0018608 A1 * | 1/2010 | Huegerich | A01M 7/0082 |
| | | | 137/579 |
| 2012/0181465 A1 | 7/2012 | Rusconi | |
| 2013/0206278 A1 | 8/2013 | Ballu | |
| 2015/0142550 A1 | 5/2015 | Owen et al. | |
| 2017/0367261 A1 * | 12/2017 | Matousek | A01D 61/008 |
| 2019/0152714 A1 * | 5/2019 | Brechon | B65G 41/008 |
| 2019/0302783 A1 * | 10/2019 | Morwood | A01B 69/008 |
| 2019/0337725 A1 * | 11/2019 | Gerdeman | B65G 33/14 |
| 2020/0224808 A1 * | 7/2020 | Moore | F16L 37/002 |

OTHER PUBLICATIONS

Written Opinion, Application No. PCT/US2018/039372, dated Sep. 24, 2018, 6 pages.

* cited by examiner (Boom in retracted or raised position)

(Boom in extended or lowered position)

CROP INPUT SUPPLY SYSTEM, METHODS AND APPARATUS

CROSS-REFERENCE TO RELATED APPLICATIONS

This application claims the benefit of U.S. Provisional Application No. 62/523,860, filed Jun. 23, 2017, and U.S. Provisional Application No. 62/548,253, filed Aug. 21, 2017 and U.S. Provisional Application No. 62/617,454, filed Jan. 15, 2018, each of which is incorporated herein in its entirety.

BACKGROUND

Various implements are used in agriculture to apply various crop inputs to fields, such as seed, liquid and granular fertilizers, pesticides, etc. Such implements generally have one or more hoppers or tanks on-board the implement which hold the crop inputs and from which the crop inputs are dispensed as the implement traverses the field. The tanks or hoppers (collectively hereinafter "tanks") have limited capacity and therefore require frequent refilling depending on the volume of the tanks, the rate the crop inputs are applied, and various other factors. When the tanks require refilling, the operator must stop field operations to refill the tanks from an available supply source. The available supply source may be a bin or holding tank at a remote location to where the implement must be driven for refilling, or the available supply source may be another vehicle (e.g., as a pickup truck carrying the crop input in sacks, or a wagon, grain cart or a holding tank) parked at one end of a field or along a road near the field. Alternatively, the operator may need to wait at one end of the field or in the middle of a field or other location until the operator is met by the supply vehicle. Regardless of which of the above described methods the grower uses for resupplying the implement with crop inputs, the cumulative effect of the frequent stops results in extended downtime in field operations during a planting season or other crop input application period, which most growers can ill-afford.

Accordingly, there is a need for a crop input supply system that minimizes or eliminates downtime of field operations of the agricultural implement.

DESCRIPTION

Figure 1:
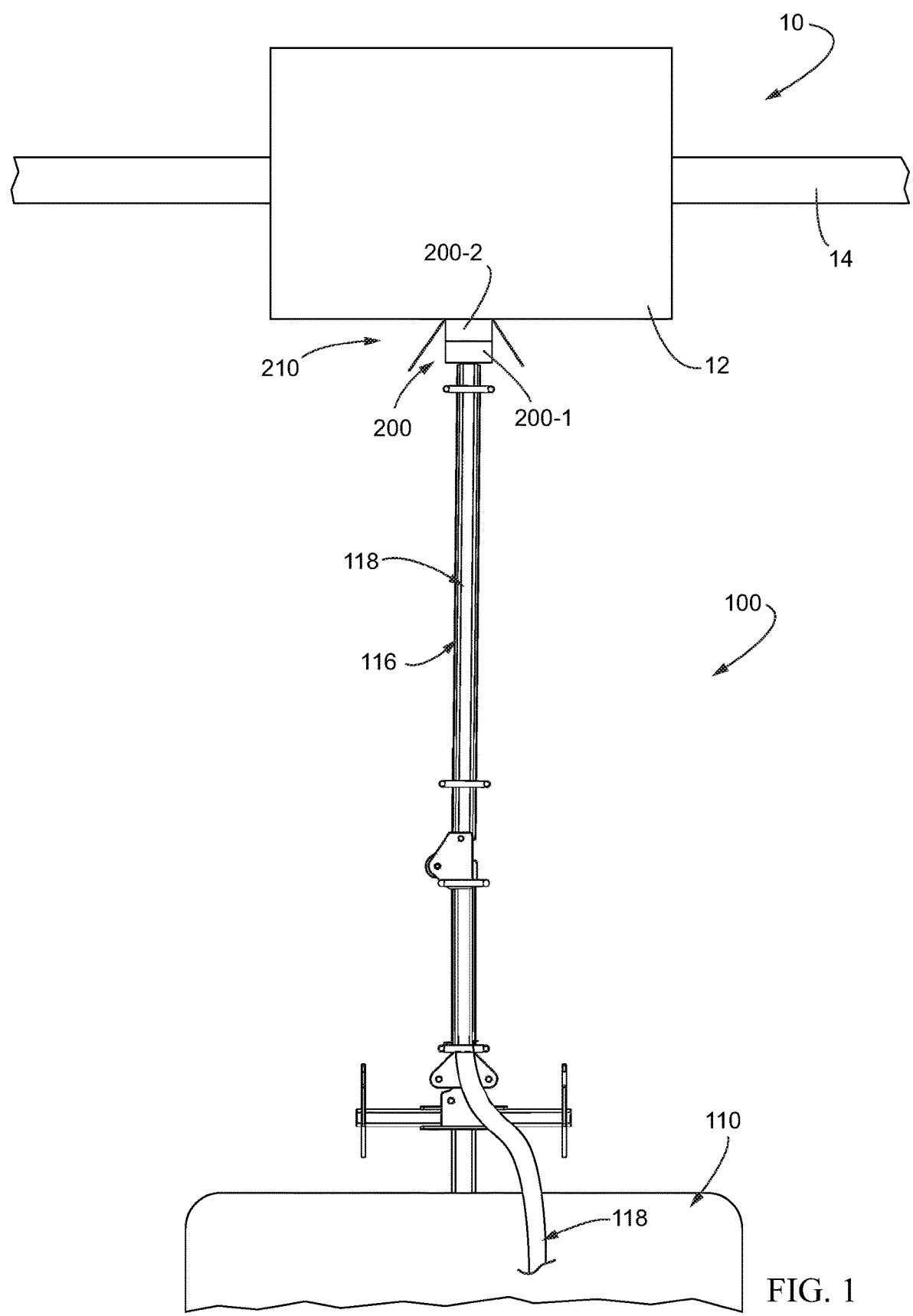
FIG. 1 is a schematic top plan view of an embodiment of a crop input supply system.
Figure 2:
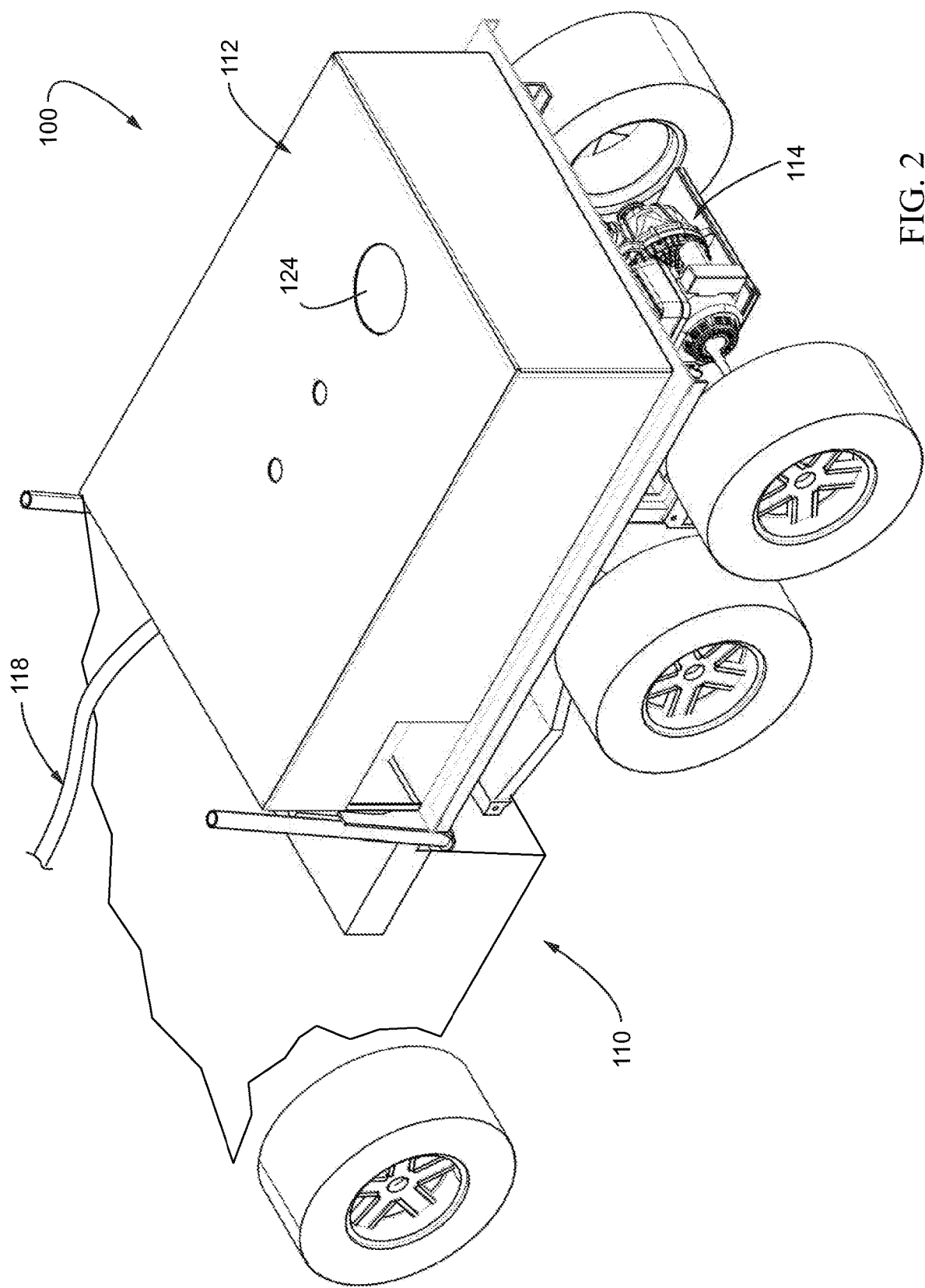
FIG. 2 is a rear perspective view of an embodiment of a vehicle comprising the crop input supply system.

Referring now to the drawings wherein like reference numerals designate the same or corresponding parts throughout the several views, FIG. 1 illustrates an embodiment of a crop input supply system 100 for resupplying crop inputs to the tanks 12 of an agricultural implement 10 (e.g., planter, drill, fertilizer applicator, herbicide applicator, pesticide applicator, biological applicator, tillage implement, etc.) operating in a field dispensing the crop inputs from the implements tanks 12 as the implement 10 traverses the field. The crop inputs may be liquid fertilizers, pesticides or other liquid crop input or the crop inputs may be granular materials, such as seed, granular fertilizer, granular pesticides or other granular crop inputs.

The crop input supply system 100 minimizes or eliminates downtime of field operations of the agricultural implement 10 by being capable of delivering a large volume of the crop input to the agricultural implement 10 in the field, and in certain embodiments, the crop input supply system 100 may resupply the implement tanks 12 while the implement is on-the-go, such that the operator of the implement 10 can continue field operations without stopping or slowing down as the implement tanks 12 are being refilled. The crop input supply system 100 includes a mobile supply vehicle ("MSV") 110, having a supply tank 112, a boom 116, a delivery hose 118 supported by the boom 116, and a coupler assembly 200 comprised of a first coupler portion 200-1 and a second coupler portion 200-2. In the embodiment shown, the first coupler portion 200-1 is represented as a male connector and the second coupler portion 200-2 is represented as a female receiver, however it should be appreciated that the first and second coupler portions need not be a male connector that mates with a female receptacle. Rather, the first and second portions 200-1, 200-2 may be any configuration that permits the first and second portions 200-1, 200-2 to couple with one another.

As used herein, the term "boom" should be understood as including any bracket, arm or other structure that supports either the first or second portions of the coupler assembly. The boom 116 may be a fixed or stationary structure, or the boom may be an extendable and retractable structure. For example, as disclosed in FIGS. 5-10 and described in more detail later, the boom may include hinged or folding boom sections, which permit the boom sections to move between an extended configuration and a folded or retracted configuration. Alternatively, the boom may comprise sections that telescope with respect to one another. Additionally, as disclosed in FIGS. 14-17 and described in detail later, the boom may pivot vertically between a raised or retracted configuration and a lowered or extended position. Furthermore, although the drawing figures show the boom mounted to a front or forward end of the MSV, it should be understood that the boom may be mounted at the rear of the MSV 110 or on either side of the vehicle and may extend forwardly of the vehicle. Alternatively, the boom may extend laterally, to the side of the vehicle and may be laterally extendable and retractable, or the boom may pivot from a forward or rearward direction to a lateral outward position for coupling with the implement 10, such as at an outboard or transverse end of the toolbar of the implement.

The first coupler portion 200-1 is in communication with the supply tank 112 via the delivery hose 118 and the second coupler portion 200-2 is in communication with the implement tank 12. A crop input transfer device ("CITD") 114 is provided to transfer the crop input from the supply tank 112 to the implement tank 12. For transferring liquid crop inputs, the CITD 114 may be a liquid pump. For transferring granular products, the CITD 114 may be a blower or entrainer assembly to air entrain granular product into an air stream. Alternatively, the CITD may be a conveyor or auger or similar device for delivering granular products.

The MSV 110, may be a utility vehicle, such as a John Deere Gator® or a sport utility vehicle (SUV), pickup truck, or other automobile that has been converted or retrofitted to carry a supply tank 112, the CITD 114 and the boom 116 with the delivery hose 118. The crop input within the supply tank 112 is communicated via a conduit 122 to an inlet of the CITD 114. The delivery hose 118 is routed from the outlet of the CITD 114 toward the front or side of the MSV 110 where the boom 116 is mounted.

The MSV 110 may be a manually operated vehicle, a fully autonomous vehicle or capable of switching between autonomous and manual operation modes. Alternatively, the MSV 110 may be operated via remote control. If the MSV 110 provides autonomous operation modes, the vehicle may include automatically controlled steering, braking, throttle, and transmission systems such as disclosed in U.S. Pat. Nos. 7,894,951 and 8,020,657, both of which are incorporated herein by reference in their entireties. Additionally, or alternatively, if the MSV 110 includes a remote operation mode permitting a user to pilot the MSV remotely, the MSV 110 may include cameras or other sensors for determining the vehicle's position in relation to the implement and the MSV 110 may include other components permitting remote control of the vehicle also as disclosed in U.S. Pat. Nos. 7,894,951 and 8,020,657.

Figure 3:
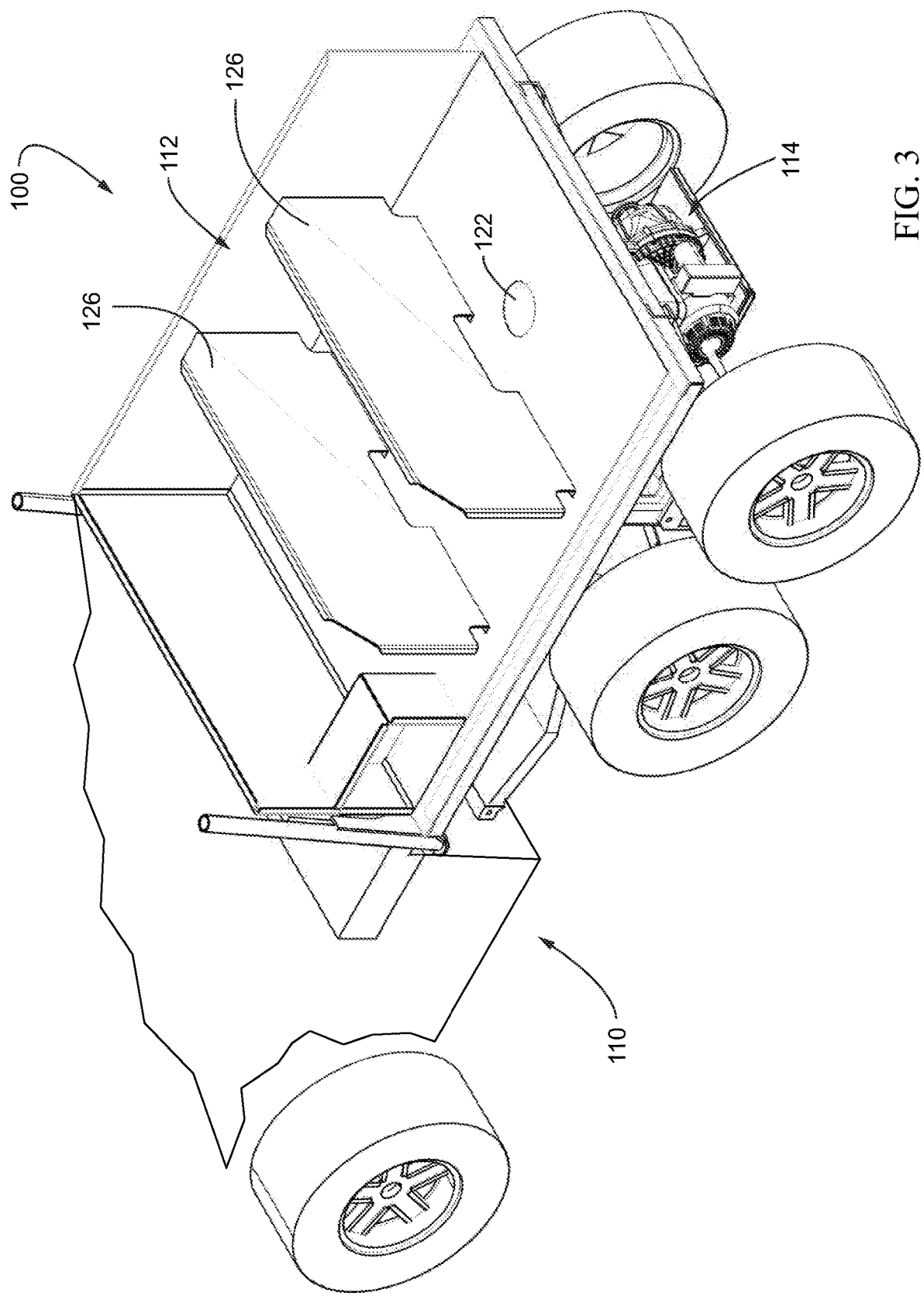
FIG. 3 is a rear perspective view of the vehicle of FIG. 2 showing a partial cutaway of the liquid tank.
Figure 4:
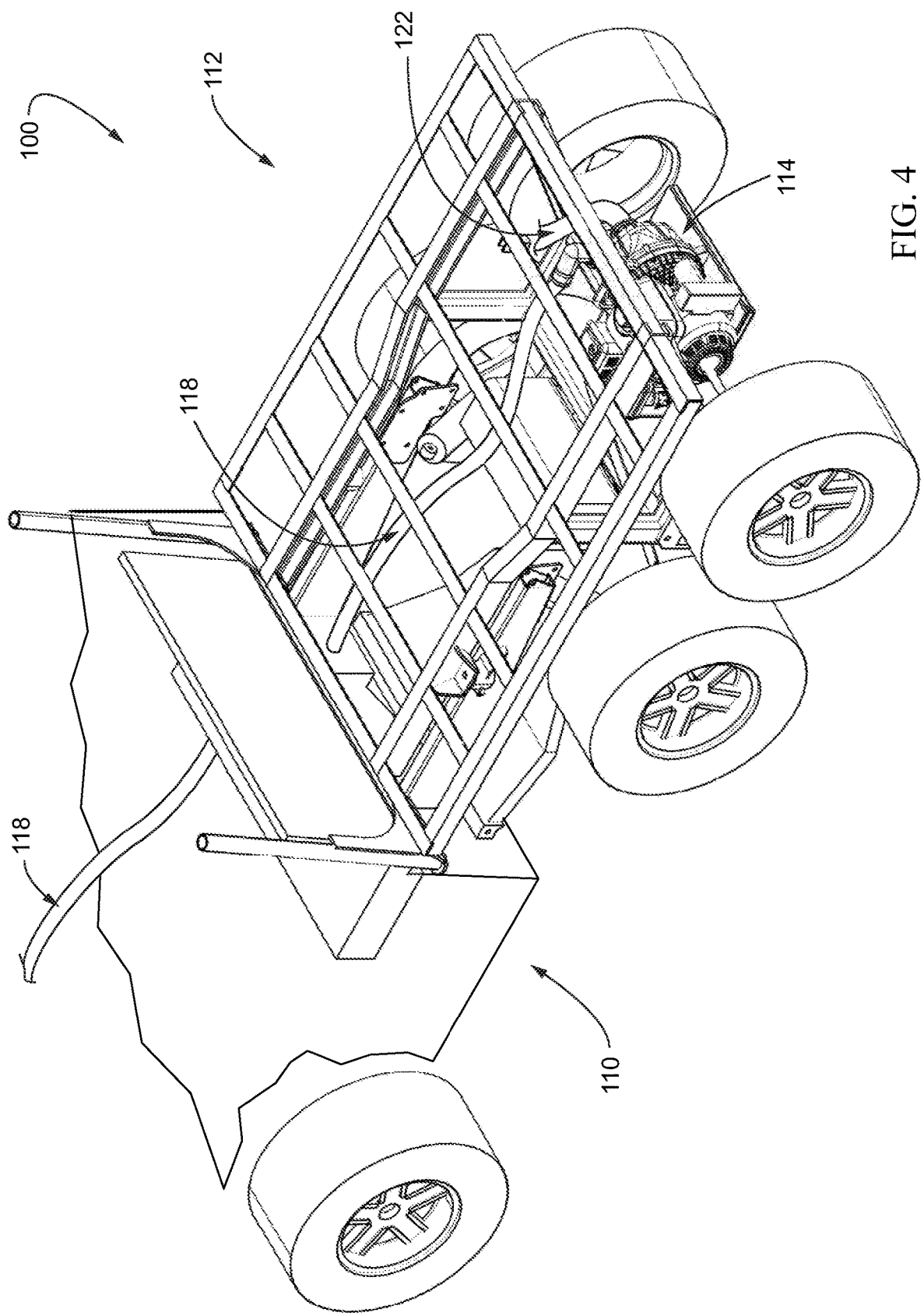
FIG. 4 is a rear perspective view of the vehicle of FIG. 2 with structure removed to show the pump.

The supply tank 112 includes an opening 124 with a lid (not shown) for filling the tank with the crop input. The supply tank 112 may include internal baffles or gussets 126 (FIG. 3) which serve as structural supports and, if the crop input is a liquid product, to dampen sloshing of the liquid product within the supply tank 112.

Figure 5:
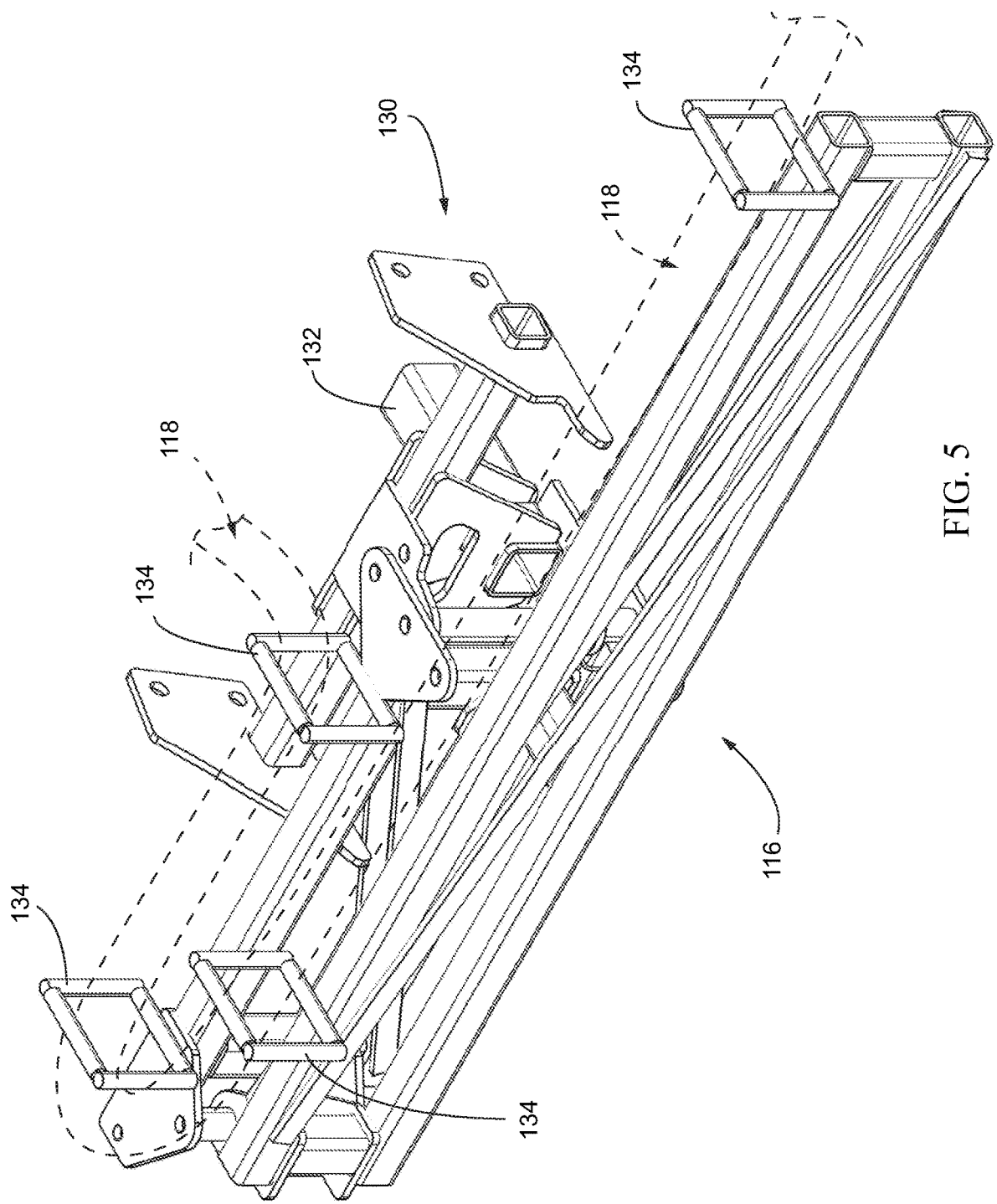
FIG. 5 is a front perspective view of an embodiment of a boom in the folded or retracted position.
Figure 6:
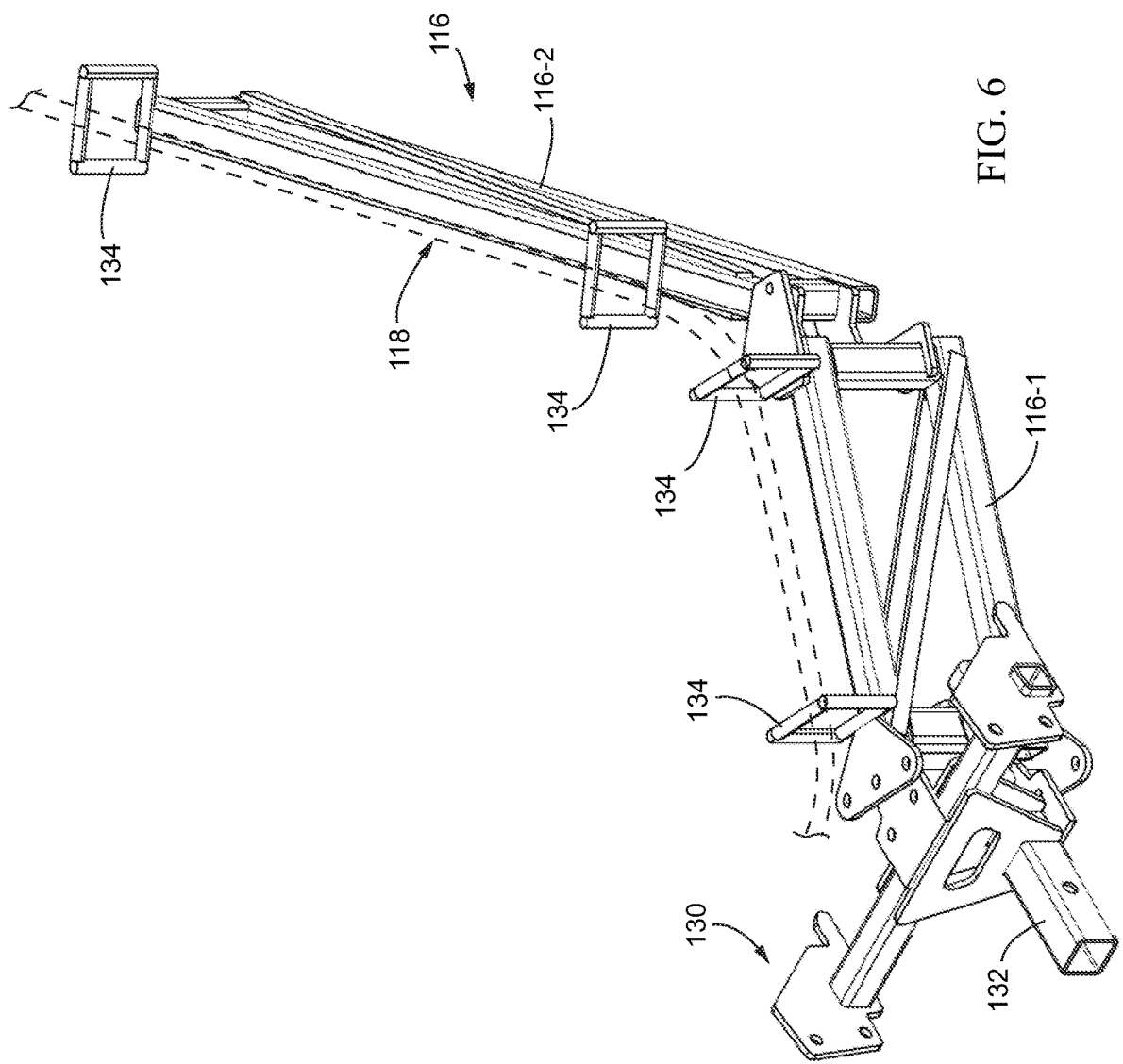
FIG. 6 is a rear perspective view of the boom of FIG. 5 in a partially extended or unfolded position.
Figure 7:
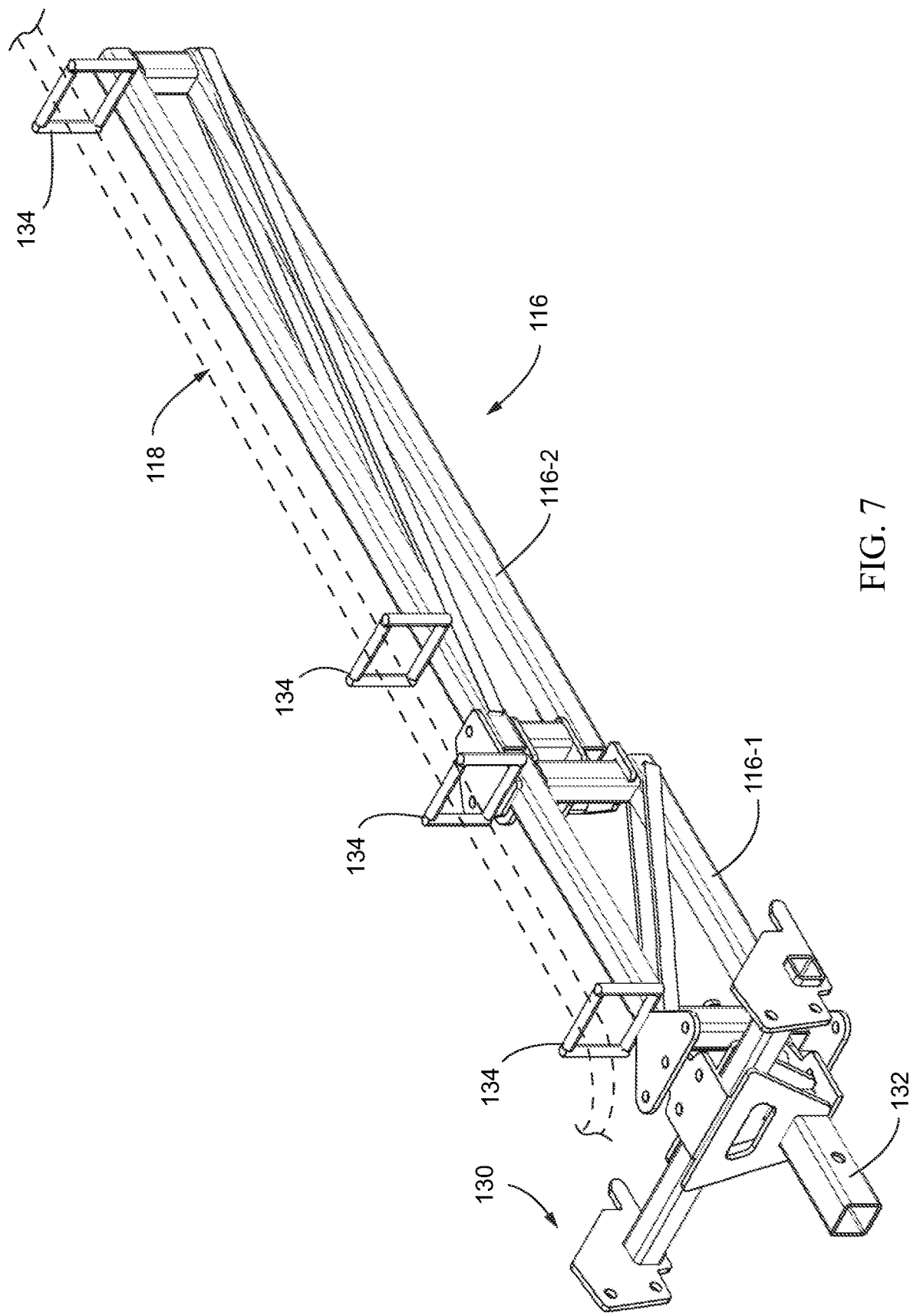
FIG. 7 is a rear perspective view of the boom of FIG. 5 in a fully extended or unfolded position.

FIGS. 5-7 illustrate an embodiment of an extendable and tractable boom 116, with FIG. 5 showing the boom in the folded or retracted position, FIG. 6 showing the boom in are partially extended or unfolded position, and FIG. 7 showing the boom 116 in the fully extended or unfolded position. The boom 116 is pivotally attached to a support frame 130. The support frame 130 may mount via a hitch 132 which is received in a hitch receiver (not shown) mounted to the vehicle 116. The boom may include hydraulic, pneumatic or electric actuators (not shown) configured to extend or retract pivoting boom segments or sections 116-1, 116-2. The boom 116 may include hose guides 134 through which the delivery hose 118 is routed so the hose will fold with the boom segments 116-1, 116-2.

Figure 8:
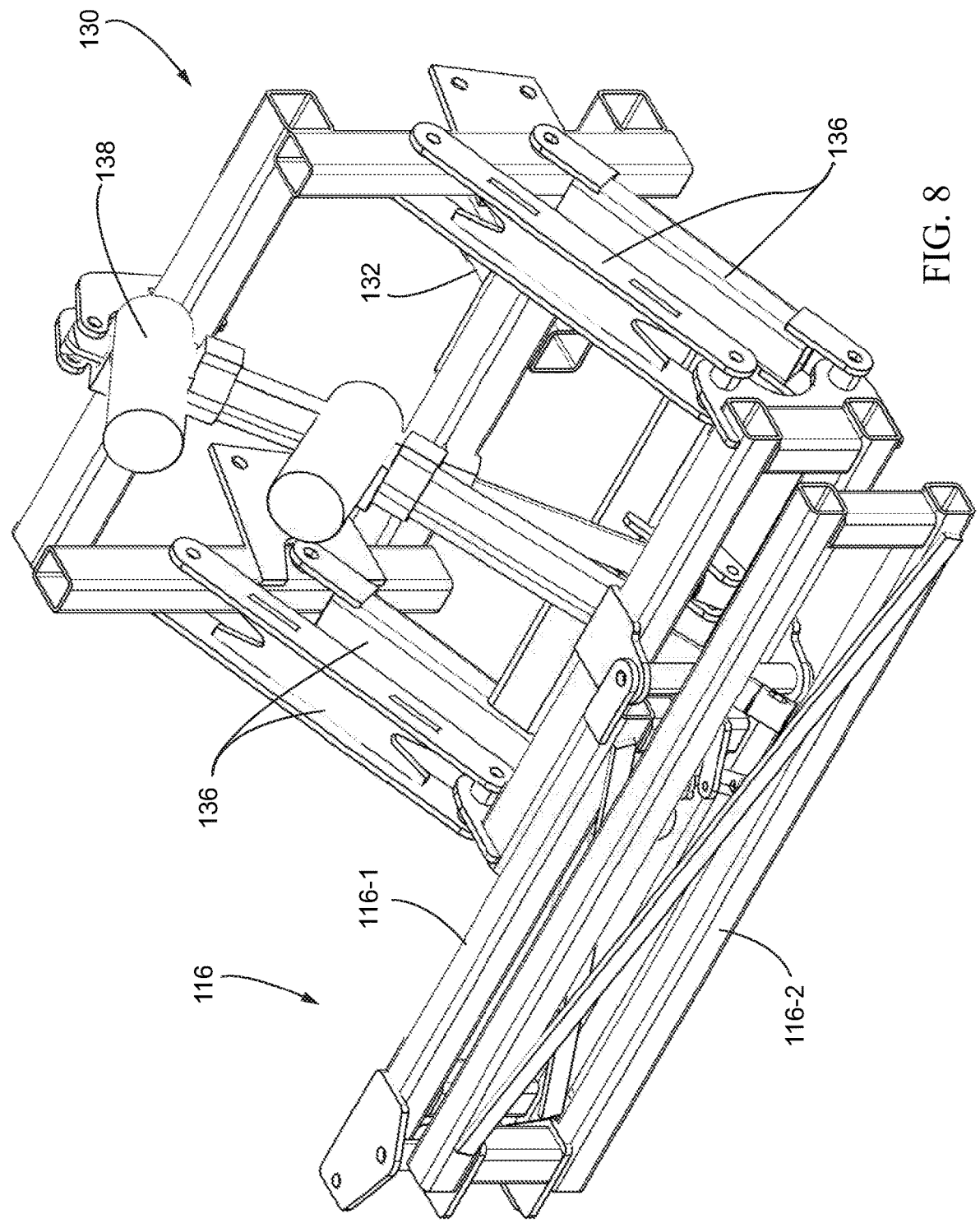
FIG. 8 is a front perspective view of another embodiment of a boom in the folded or retracted position.
Figure 9:
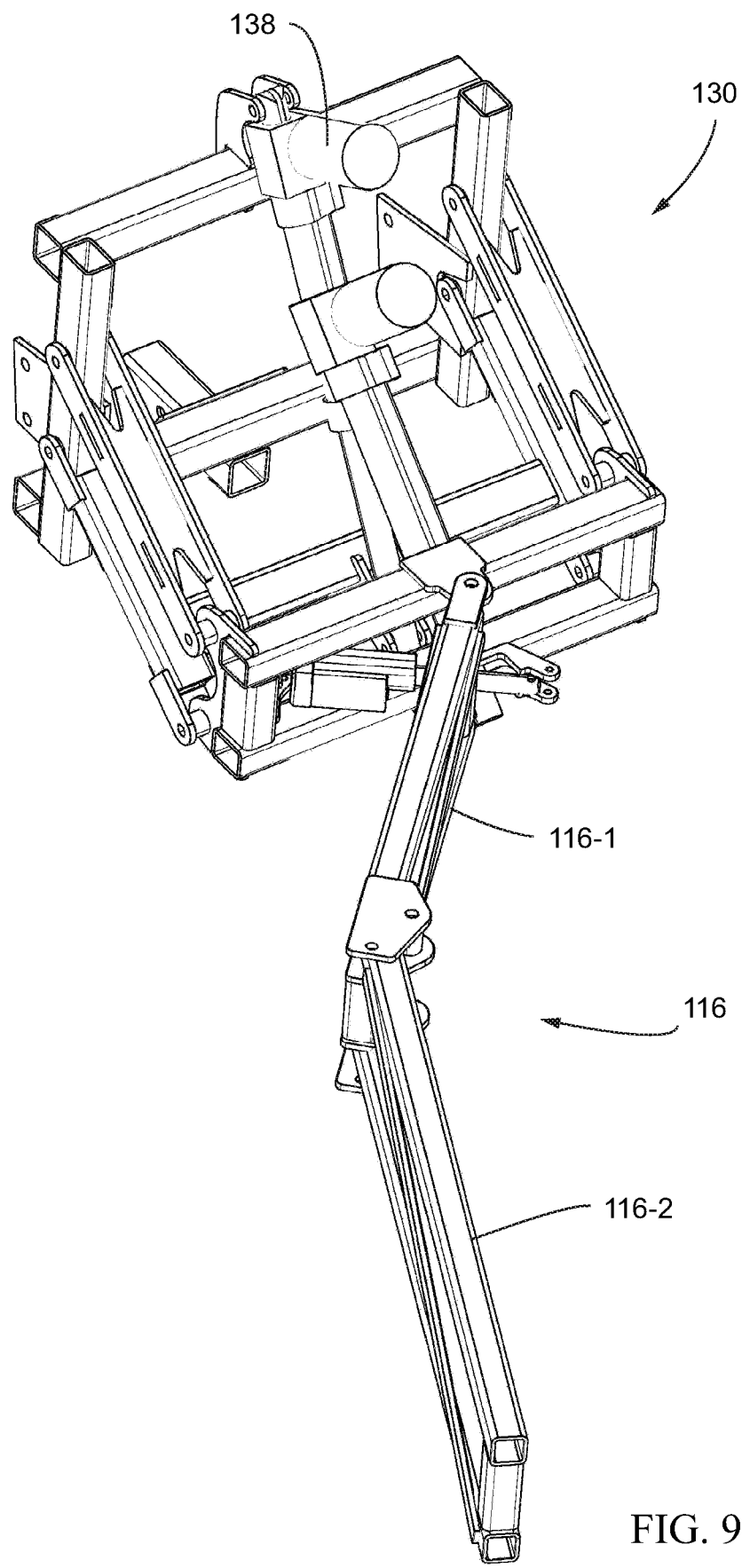
FIG. 9 is a front perspective view of the boom of FIG. 8 in a partially extended or unfolded position.
Figure 10:
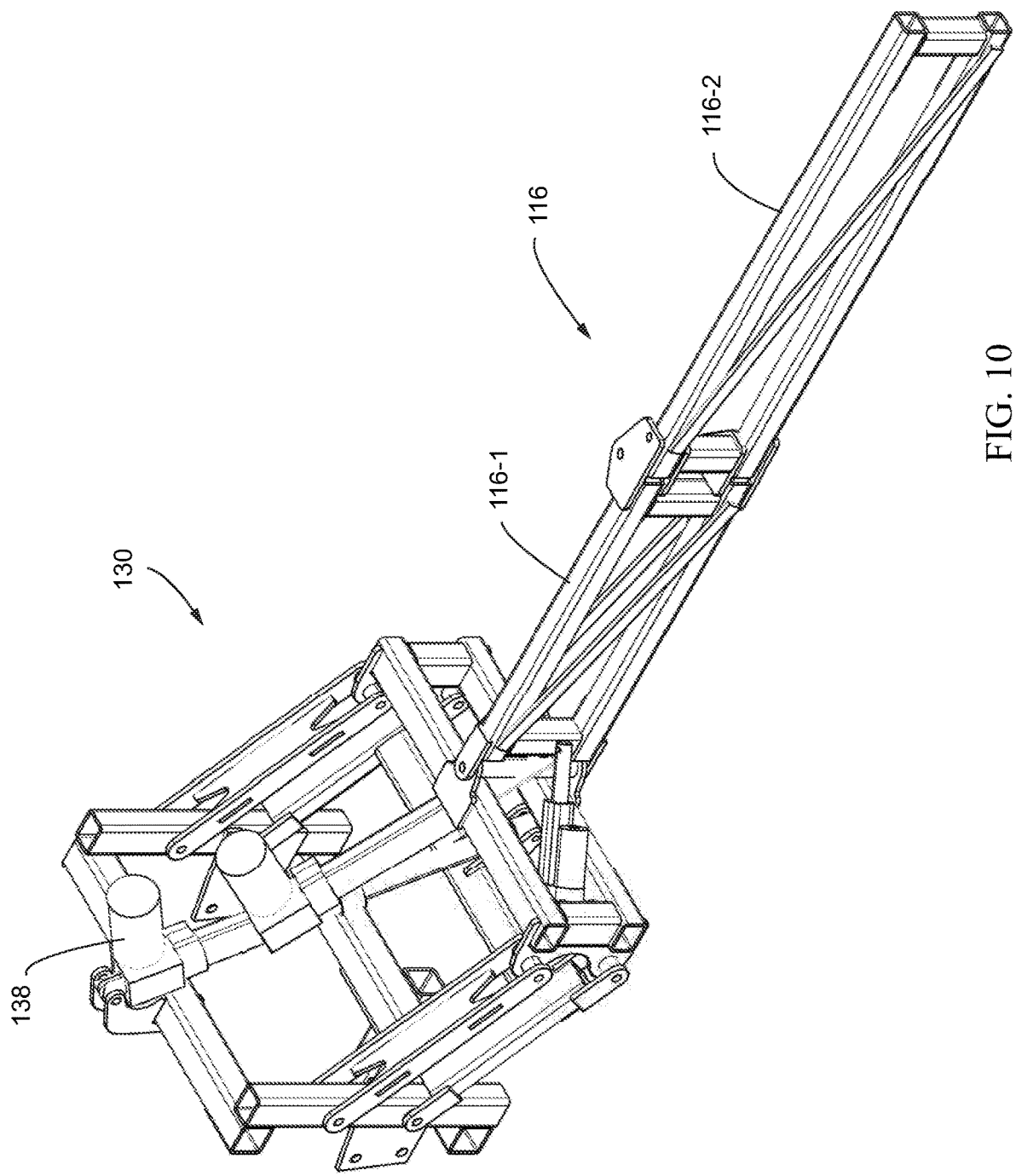
FIG. 10 is a front perspective view of the boom of FIG. 8 in a fully extended or unfolded position.

FIGS. 8-10 illustrate another embodiment of an extendable and tractable boom 116, with FIG. 8 showing the boom in the folded or retracted position, FIG. 9 showing the boom in a partially extended or unfolded position, and FIG. 10 showing the boom 116 in the fully extended or unfolded position. As in the previous embodiment, the boom 116 is pivotally attached to a support frame 130. The support frame 130 may mount via a hitch 132 which is received in a hitch receiver (not shown) mounted to the MSV 110. The boom may include hydraulic, pneumatic or electric actuators (not shown) configured to extend or retract the pivoting boom segments 116-1, 116-2. Although the hose 118 is not shown on the boom 116 in FIGS. 8-10, it should be appreciated that the hose 118 is supported by the boom 116 and the boom may include hose guides as previously described through which the hose 118 is routed, so the hose will fold with the boom segments 116-1, 116-2. In the embodiment of FIGS. 8-10, the support frame 130 includes parallel linkages 136 which may be raised and lowered by actuators 138 for raising or lowering the boom 116 relative to the vehicle 110, and relative to the ground elevation which may be desirable to account for height variations when coupling with the implement 10 (discussed below).

Although not shown in FIGS. 5-10, it should be appreciated that the boom 116 may support either the first coupler portion 200-1 or the second coupler portion 200-2, with the other mating portion 200-2, 200-1, respectively supported by the implement 10.

Figure 11A:
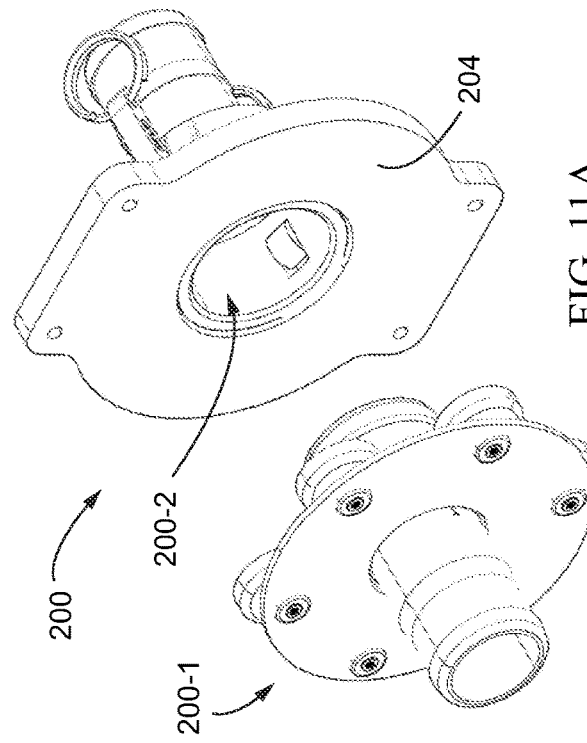
FIGS. 11A-11B are respective front and rear perspective views of the magnetic coupling assembly of FIG. 11 with the male end and the female receiver decoupled.
Figure 11B:
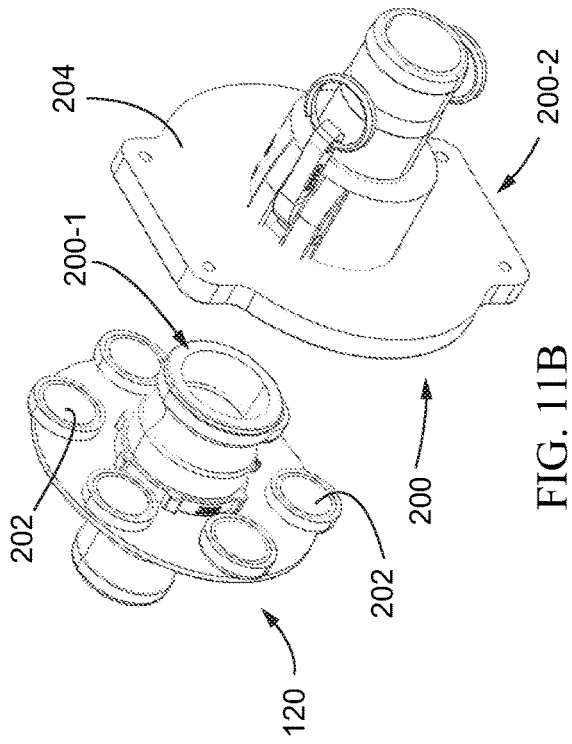
Figure 11:
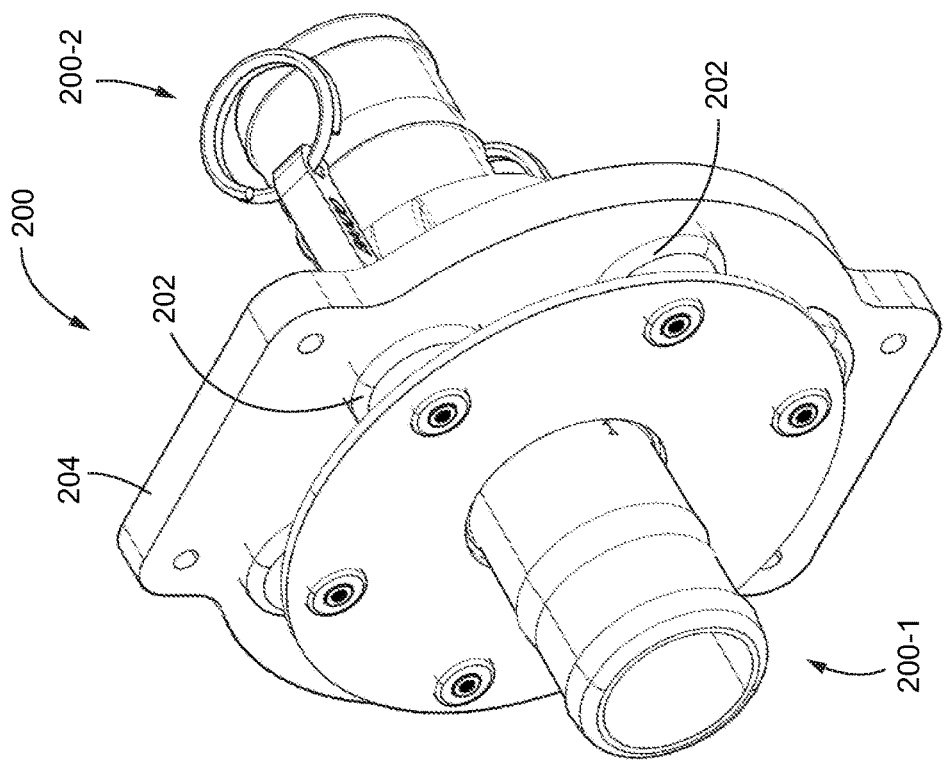
FIG. 11 is a perspective view of an embodiment of a breakaway magnetic coupling assembly.
Figure 12B:
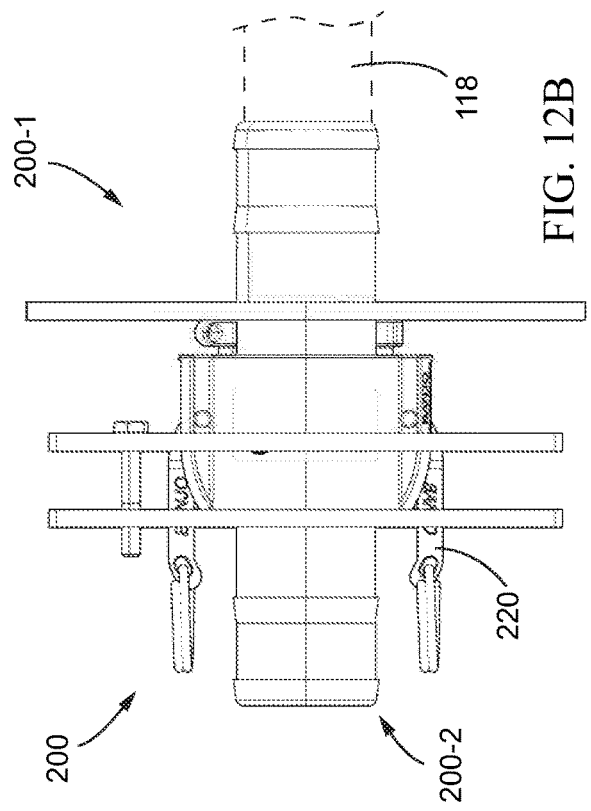
FIG. 12B is an elevation view of the coupling assembly of FIG. 12 with the male end and the female receiver coupled.
Figure 12C:
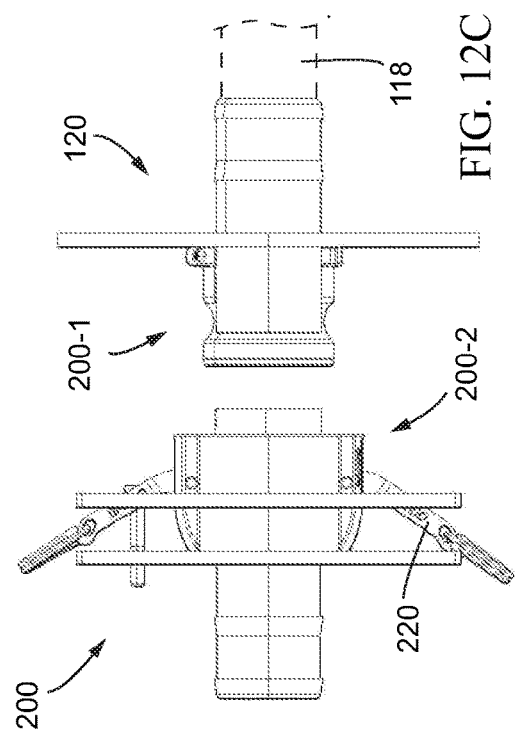
FIG. 12C is an elevation view of the coupling assembly of FIG. 12 with the male end and the female receiver decoupled.
Figure 12:
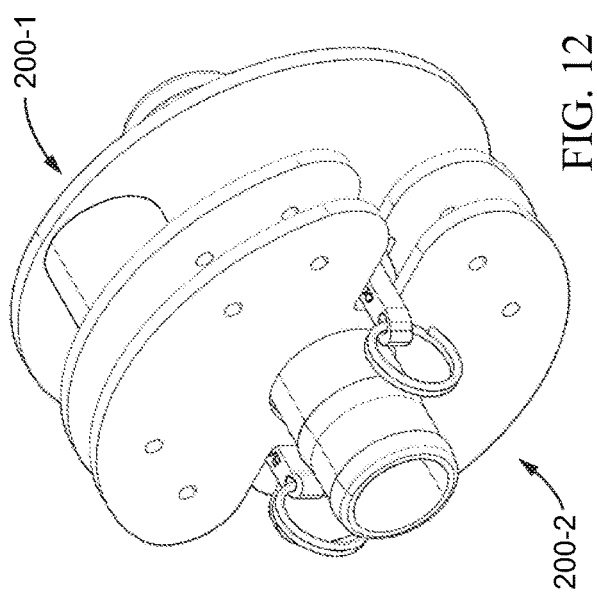
FIG. 12 is a perspective view of another embodiment of a coupling assembly utilizing cam locks.
Figure 12A:
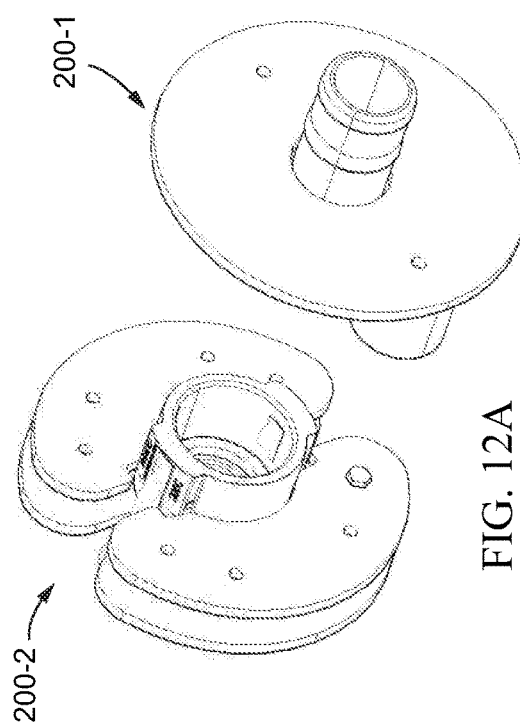
FIG. 12A is a perspective view of the coupling assembly of FIG. 12 with the male end and the female receiver decoupled.
Figure 13:
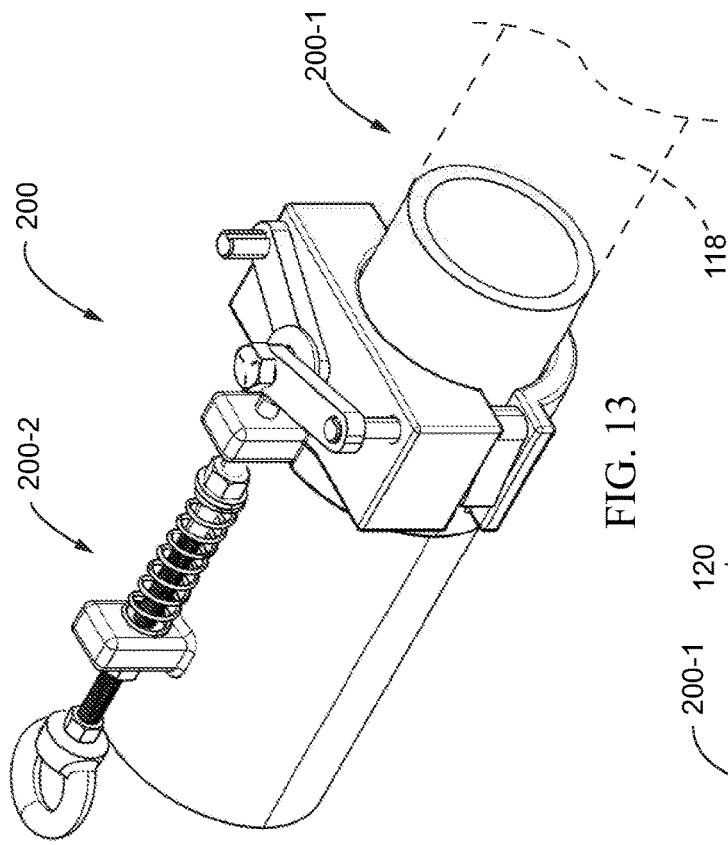
FIG. 13 is a perspective view of another embodiment of a coupling assembly.
Figure 13:
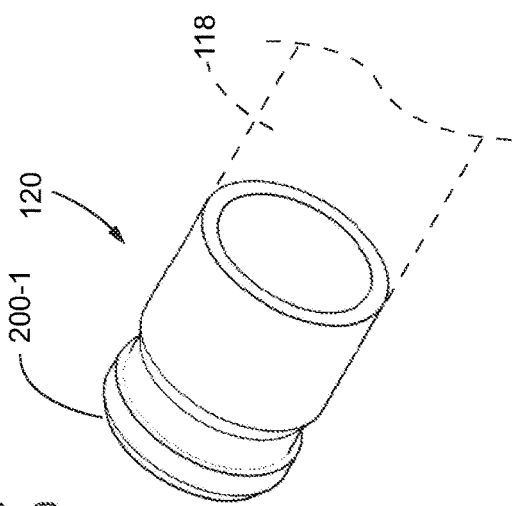
Figure 13A:
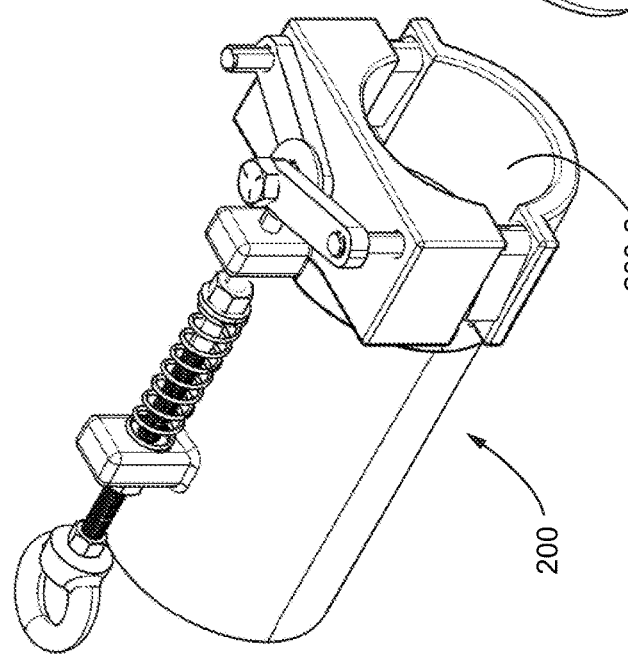
FIG. 13A is a perspective view of the coupling assembly of FIG. 13 with the male end and the female receiver decoupled.
Figure 14:
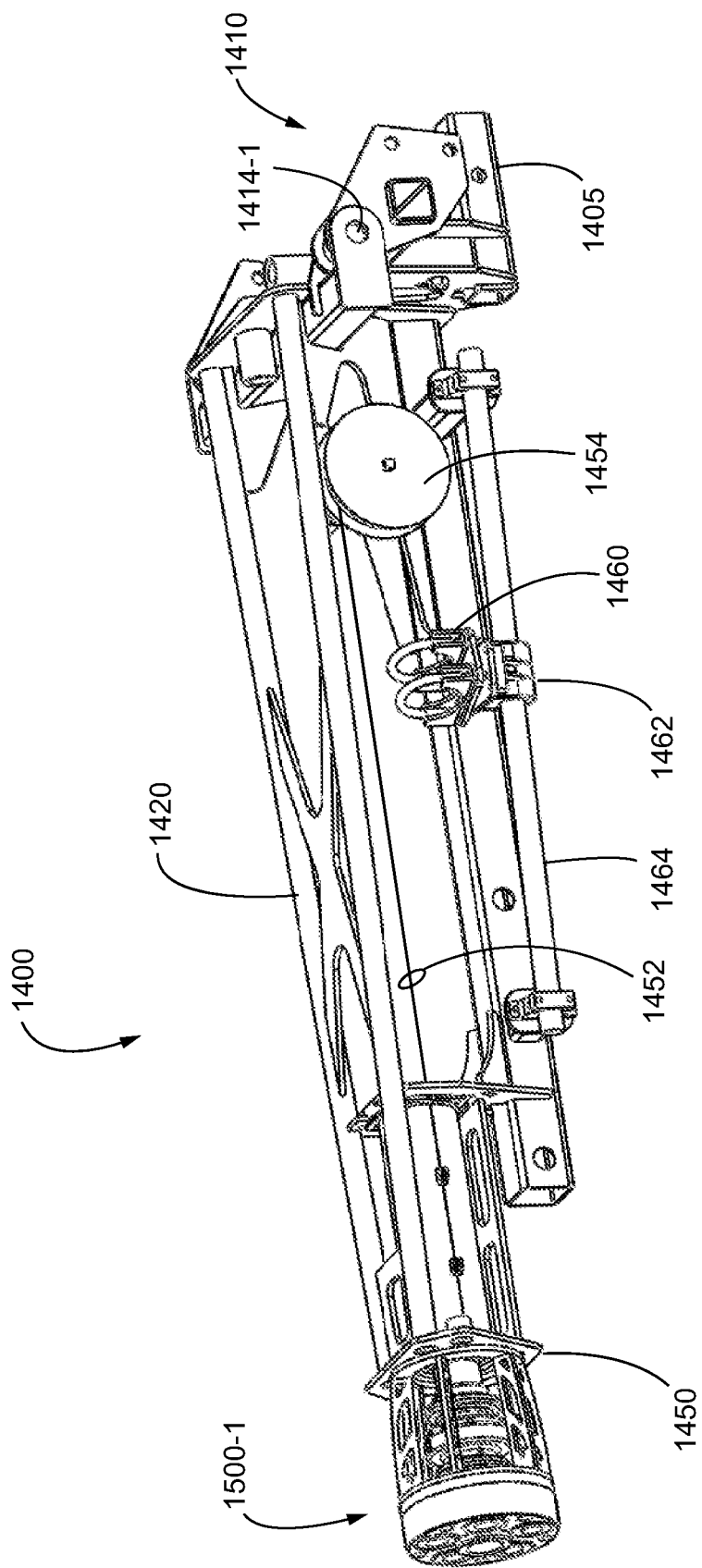
FIG. 14 is a perspective view of another embodiment of a boom assembly.

FIGS. 11-13 show different types of coupling mechanisms which may be used with the coupling assembly 200 for matingly coupling the first and second coupling portions 200-1, 200-2. FIG. 11 is an embodiment of a magnetic coupling mechanism, such as Banjo® coupler which incorporates an electromagnetic retention assembly. One end (which may be the female end or the male end) is attached to the toolbar 14 or frame of the agricultural implement 10. The Banjo® coupler allows for a liquid tight connection and transfer of the crop input to the implement tanks 12 while on-the-go. The electromagnetic retention assembly includes electromagnet(s) 202 that attach to a metal strike plate 204 on the implement side. When this connection takes place, the mating first connector portion 200-1 and second connector portion 200-2 seal with one another. In the embodiment shown in FIG. 11, the male connector 200-1 at the end of the delivery hose 118 mates into the female receiver 200-2 on the toolbar 14. The electromagnet retention assembly may comprise a donut shaped magnet, with the male connector 200-1 located in the middle. Alternatively, the electromagnetic retention assembly may comprise a ring of multiple smaller magnets around the male connector 200-1.

The female receiver 200-2 contains an EPDM seal that makes the connection watertight. The holding strength of the magnets keep the male connector 200-1 pulled in tight enough into the seal. The implement-side of the coupling assembly 200 may include an alignment aid 210 (FIG. 1) that helps guide and direct the male connector 200-1 into a proper mating connection with the female receiver 200-2. Sensors (not shown) may be provided to trigger the magnets 202 to turn on and off. For example, the alignment aid 210 may be a funnel-like structure having a conical peripheral wall extending between a larger diameter rearwardly facing open end which tapers inwardly forward toward the toolbar 14. The wall of the alignment aid 210 may form an annular region within which a strike plate and female receiver 200-2 is located. In operation, the male connector 200-1 is configured to have an electromagnetic retention assembly which will attach to the metal strike plate, thereby holding male connector 200-1 tightly within female receiver 200-2. Sensors (not shown), for example a proximity sensor, may be provided to trigger the magnets 202 to turn on and off.

FIGS. 12 and 13 illustrate alternative coupling mechanisms in which the male connector 200-1 and the female receiver 200-2 are mechanically coupled via a mechanical locking mechanism. For example, FIG. 12 illustrates a cam-lock type Banjo® coupler, in which cam levers 220 are pivoted to lock the male connector 200-1 with the female receiver 200-2. FIG. 13 illustrates another type of Banjo® coupler, in which a spring biased rod may be pulled to open and close the coupling connection between the male connector 200-1 and the female receiver 200-2

Manual or electric valves may also need to be opened. The operator of the MSV 110 may initiate power to the coupling assembly 200 in order for the connection to take place.

FIGS. 14-17 illustrate another embodiment of a boom assembly 1400. The boom assembly 1400 optionally includes a support frame 1410 supported on a hitch 1405 which couples the boom assembly 1400 to a vehicle 110 (e.g., a utility vehicle as described elsewhere herein). The boom assembly 1400 includes a boom 1420 which may be pivotally coupled to the support frame 1410. In some embodiments, the boom 1420 is pivotally coupled to the support frame 1410 by a pivot pins 1414-1, 1414-2 for pivoting about a generally horizontal axis A-A (FIG. 15) which may extend generally transversely to the direction of vehicle travel. Comparing FIGS. 16 and 17, the boom 1420 may be pivoted about the axis A-A in order to reconfigure the boom assembly between an extended or lowered configuration (denoted 1400A) to a retracted or raised configuration (denoted 1400B).

Figure 15:
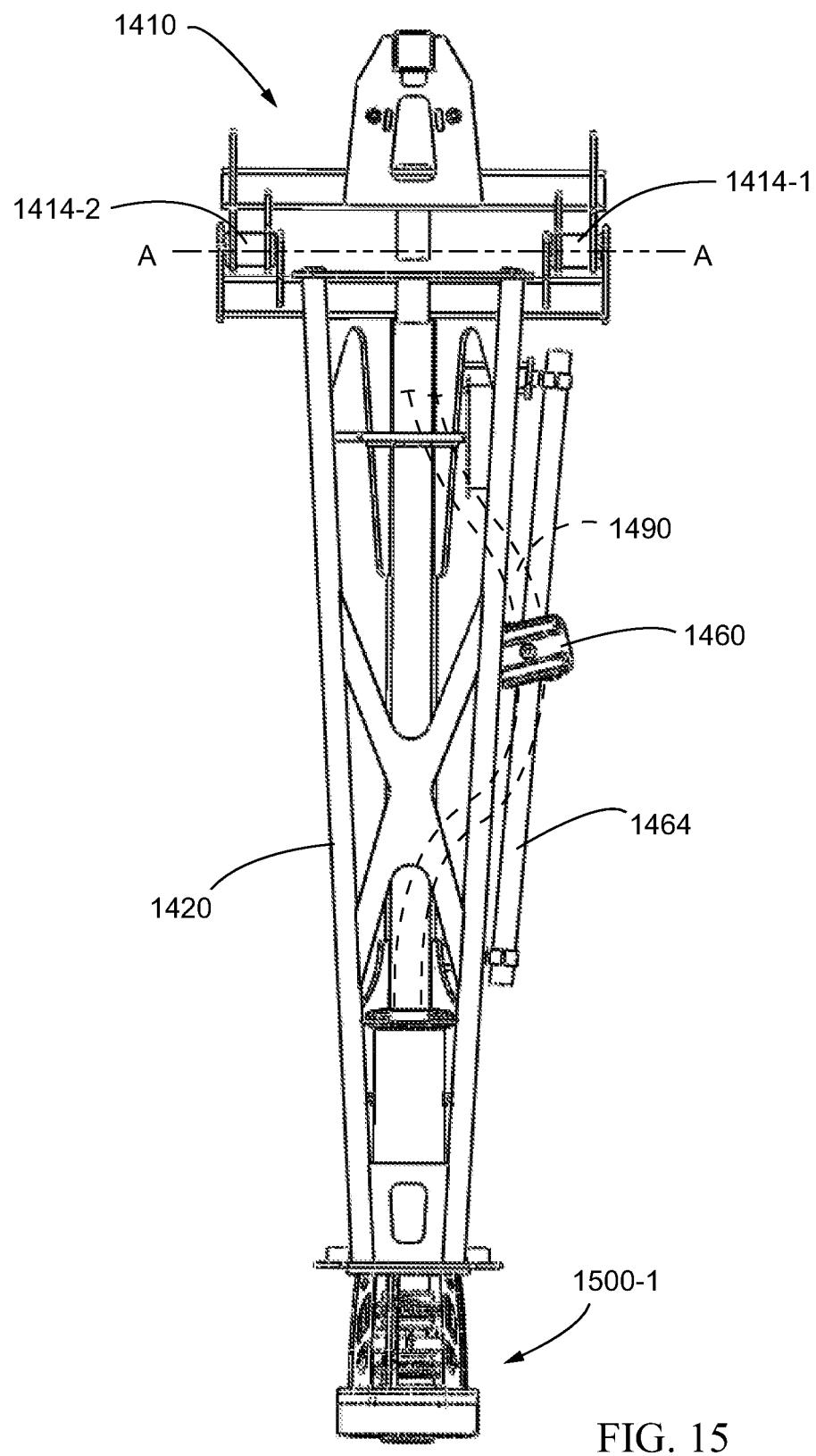
FIG. 15 is a plan view of the boom assembly of FIG. 14.
Figure 16:
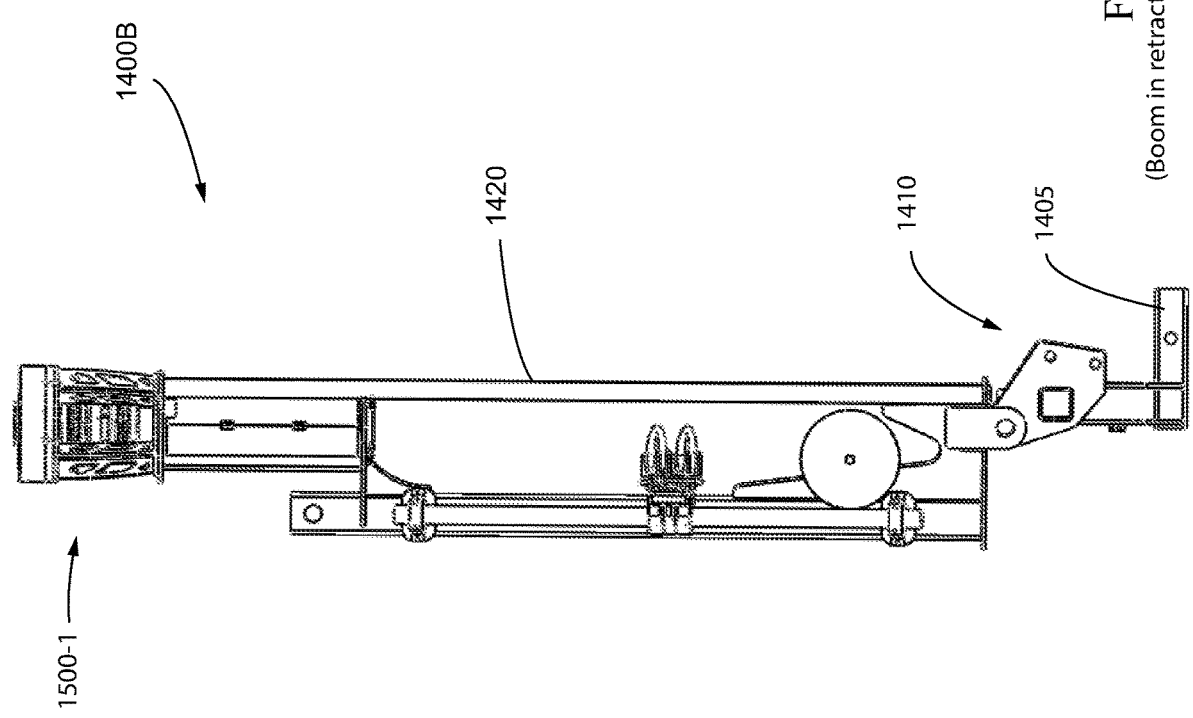
FIG. 16 is a side elevation view of the boom assembly of FIG. 14 in a retracted or raised configuration.
Figure 17:
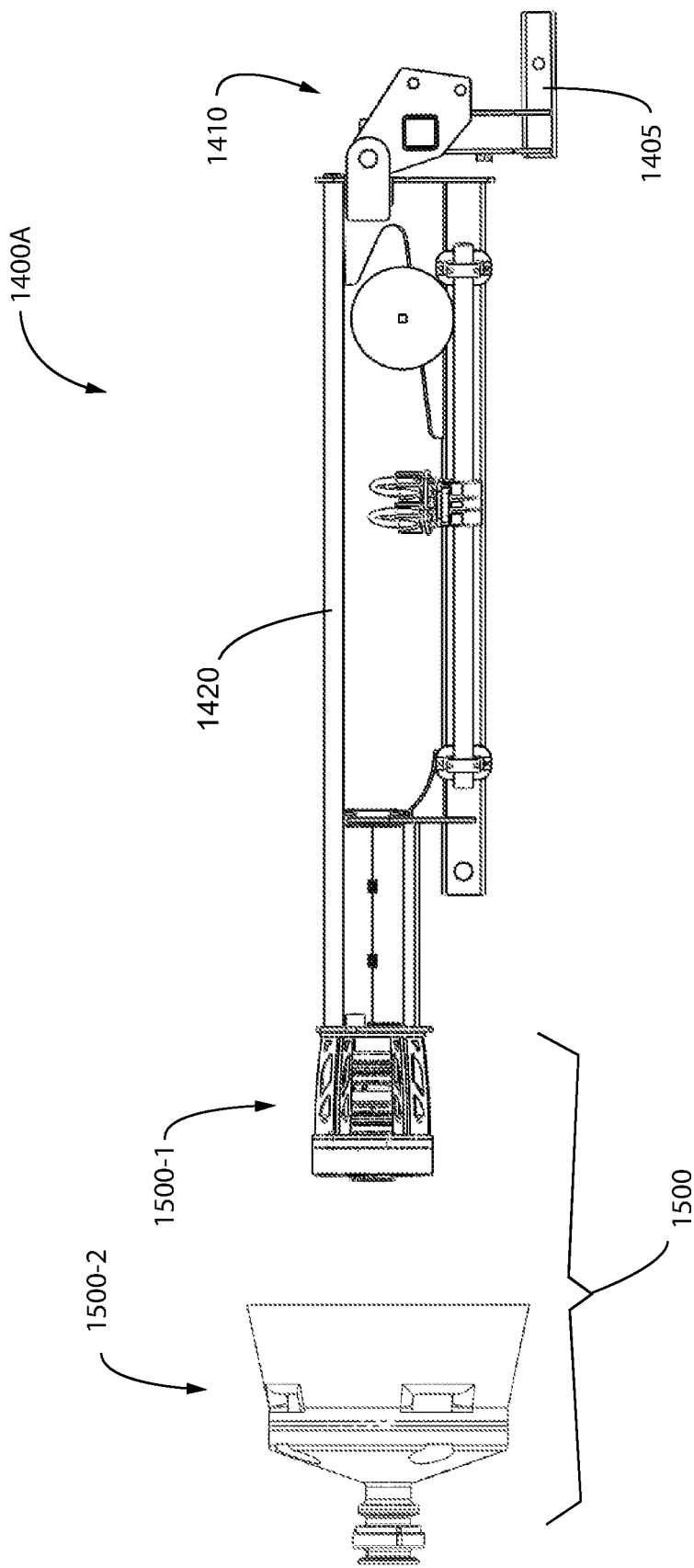
FIG. 17 is a side elevation view of the boom assembly of FIG. 14 in an extended or lowered configuration and another embodiment of a coupler.

As in the previous embodiment, a coupler assembly 1500 is provided with a first coupler portion 1500-1 and a second coupler portion 1500-2. The first coupler portion 1500-1 is supported at a forward end of boom 1420 and is in communication with the delivery hose 1490 (FIG. 15). The hose 1490 is in communication with the supply tank 112 on the MSV 110. The first coupler portion 1500-1 is retained at the end of boom 1420 against a retention plate 1450 by one or more cables 1452 (FIG. 14) which are resiliently retracted by a spring wrap reel 1454. The spring wrap reel 1454 resiliently permits displacement of the first coupler portion 1500-1 away from (e.g., forward of) retention plate 1450 (e.g., upon connecting the first coupler portion 1500-1 to the second coupler portion 1500-2 on the implement). In operation, when the displaced first coupler portion 1500-1 is released, the spring wrap reel optionally retracts the first coupler portion 1500-1 into position against the retention plate 1450.

Referring to FIG. 15, the hose 1490 has a certain amount of slack when the first coupler portion 1500-1 is in position against the retention plate 1450 such that the first coupler portion 1500-1 is permitted to be displace without damaging the hose. The hose 1490 may extend through a hose guide 1460 (e.g., comprising one or more rings securing the hose 1490 thereto). The hose guide 1460 may be slidingly supported on a generally longitudinally-extending rail 1464 such that the hose guide 1460 can be displaced forward and backward with movement of the first coupler portion 1500-1 and/or hose 1490. In some embodiments, the hose guide 1460 is pivotally coupled (e.g., for pivoting about a generally vertical axis) to a sliding support 1462 (FIG. 14) which is in turn slidingly supported on the rail 1464.

Figure 18:
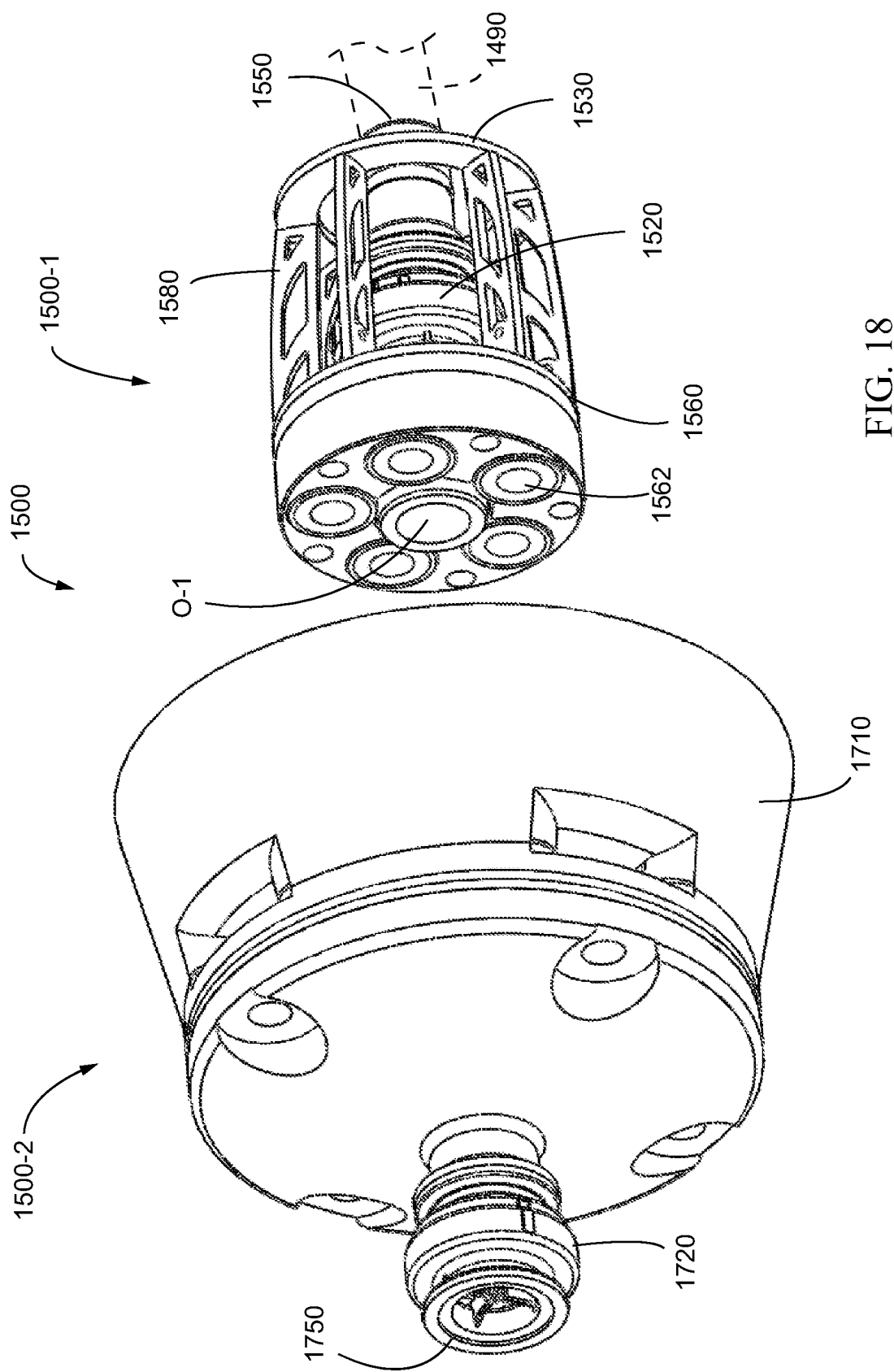
FIG. 18 is a perspective view of the coupler of FIG. 17 showing the male end and female coupler.
Figure 19:
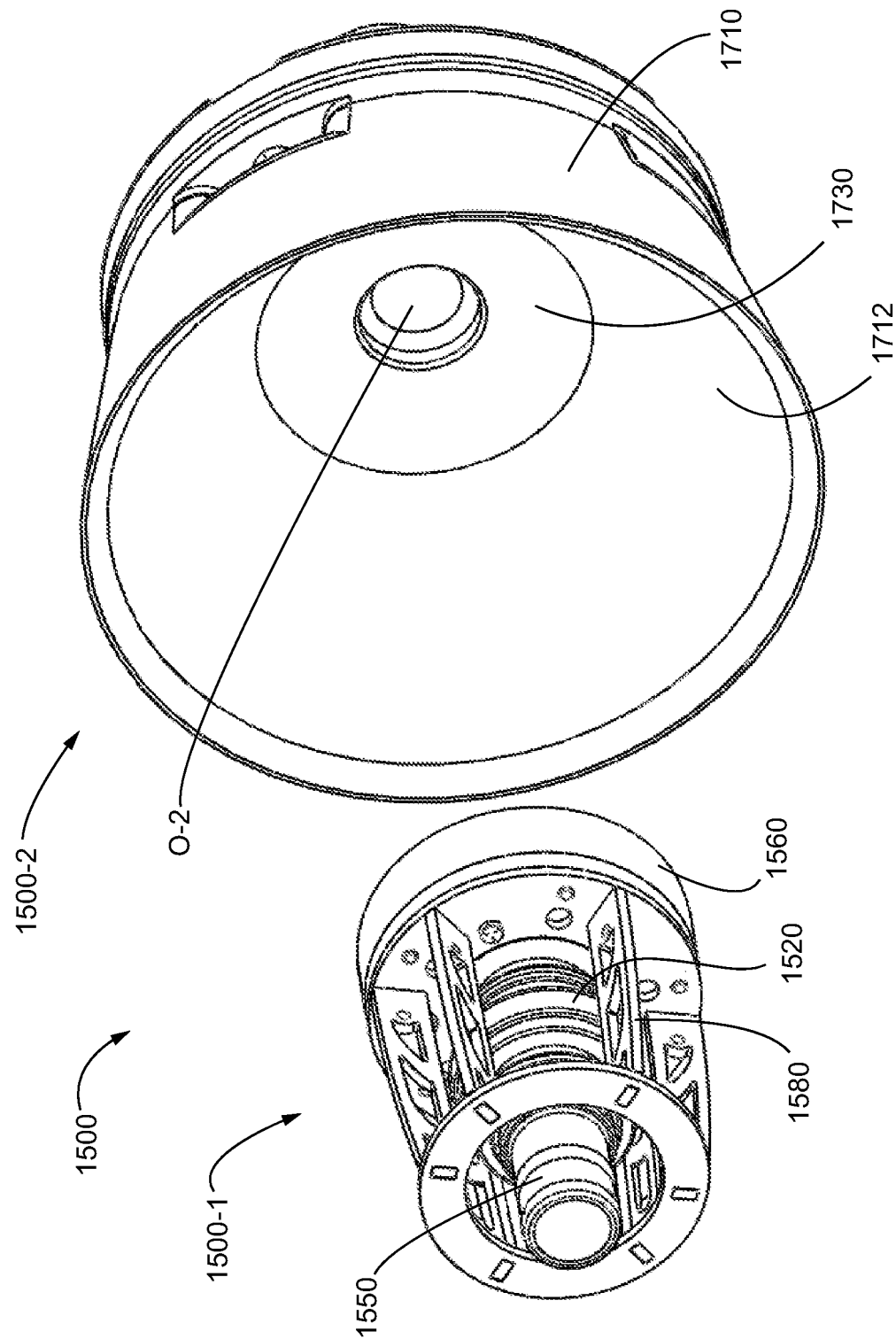
FIG. 19 is another perspective view of the coupler of FIG. 17 showing the male end and female coupler of FIG. 17.
Figure 20:
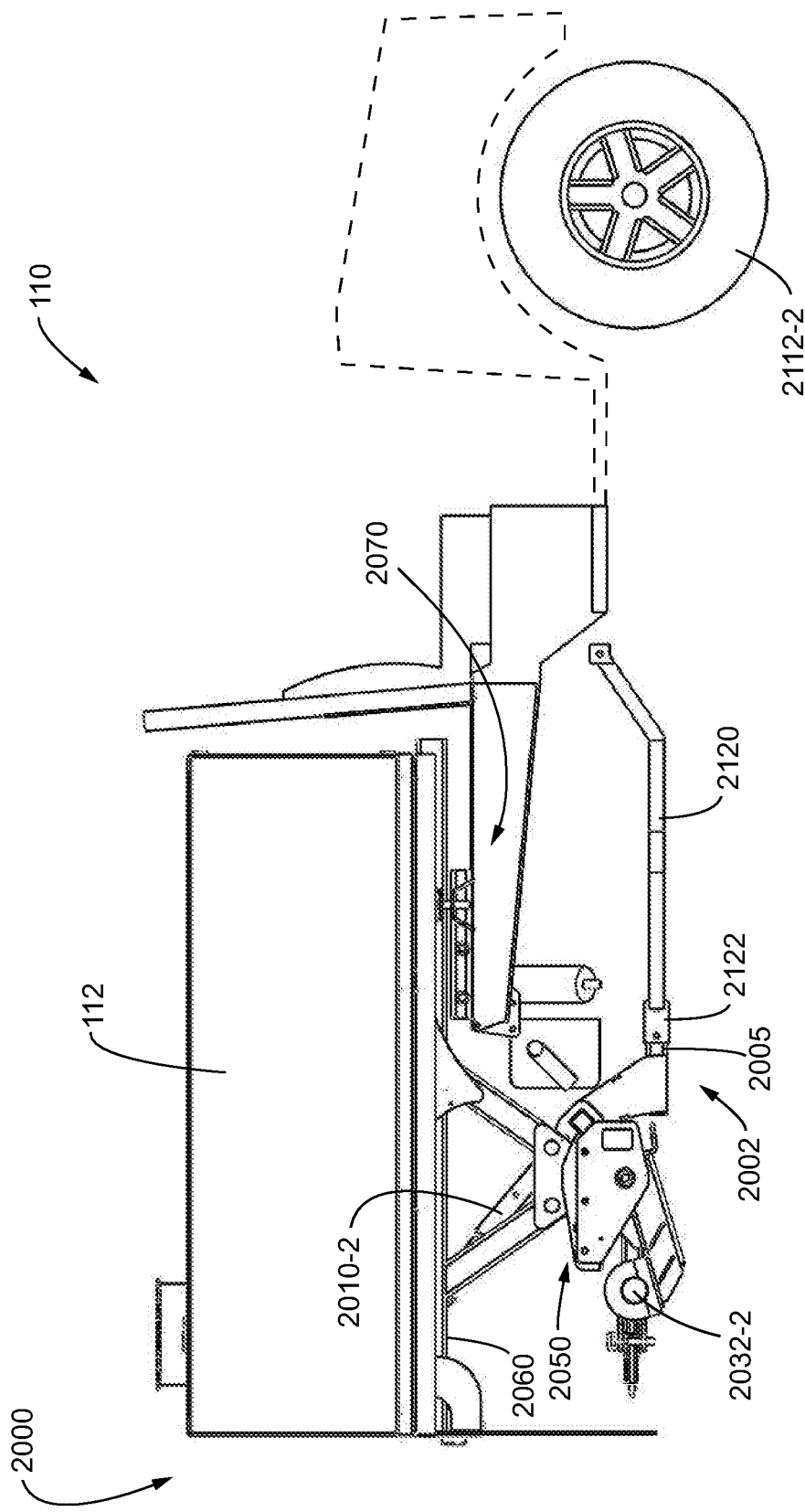
FIG. 20 is a partial side elevation view of an embodiment of a vehicle and an embodiment of a tank support assembly.
Figure 21:
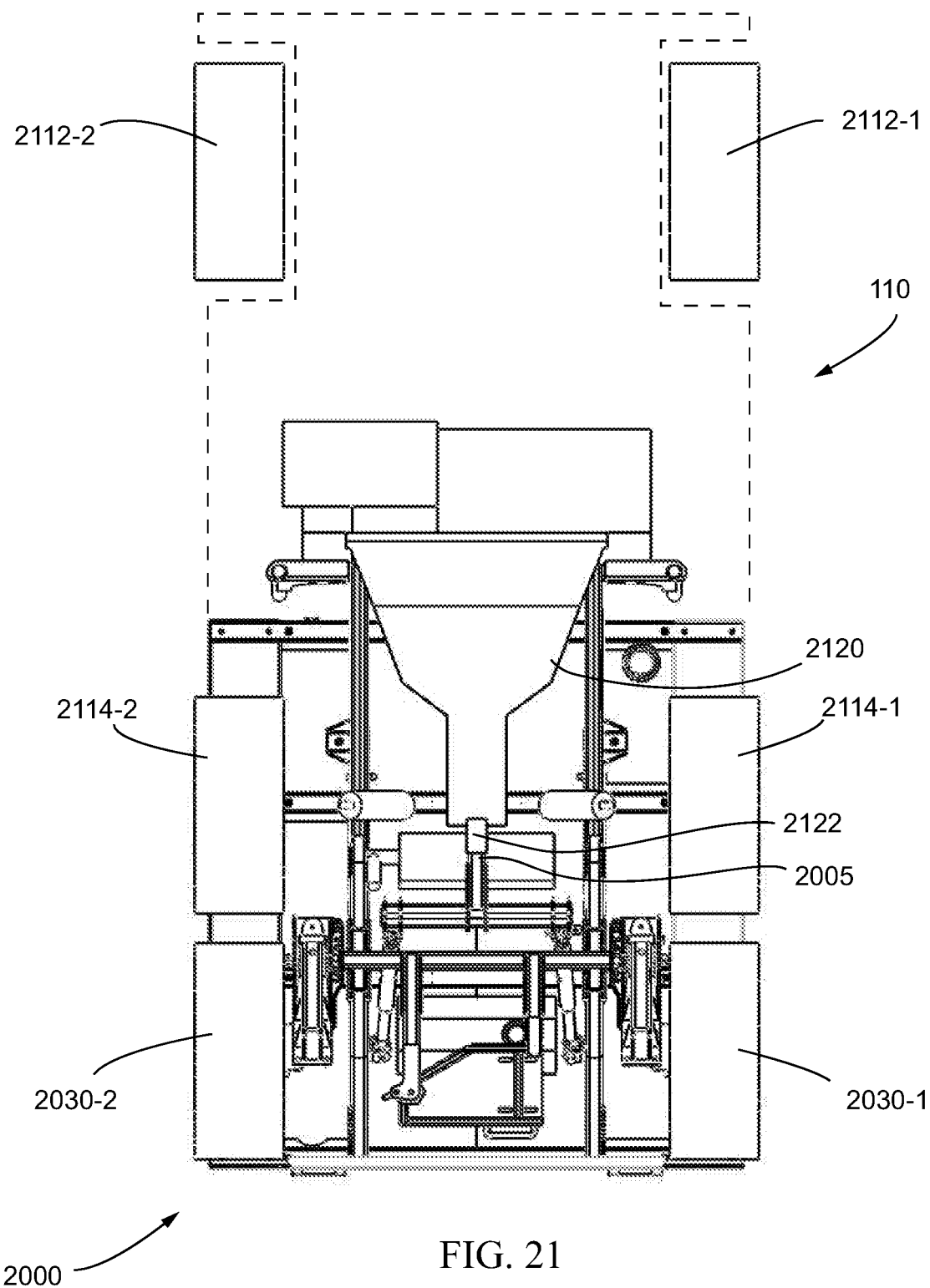
FIG. 21 is a bottom view of the vehicle and tank support assembly of FIG. 20.
Figure 22:
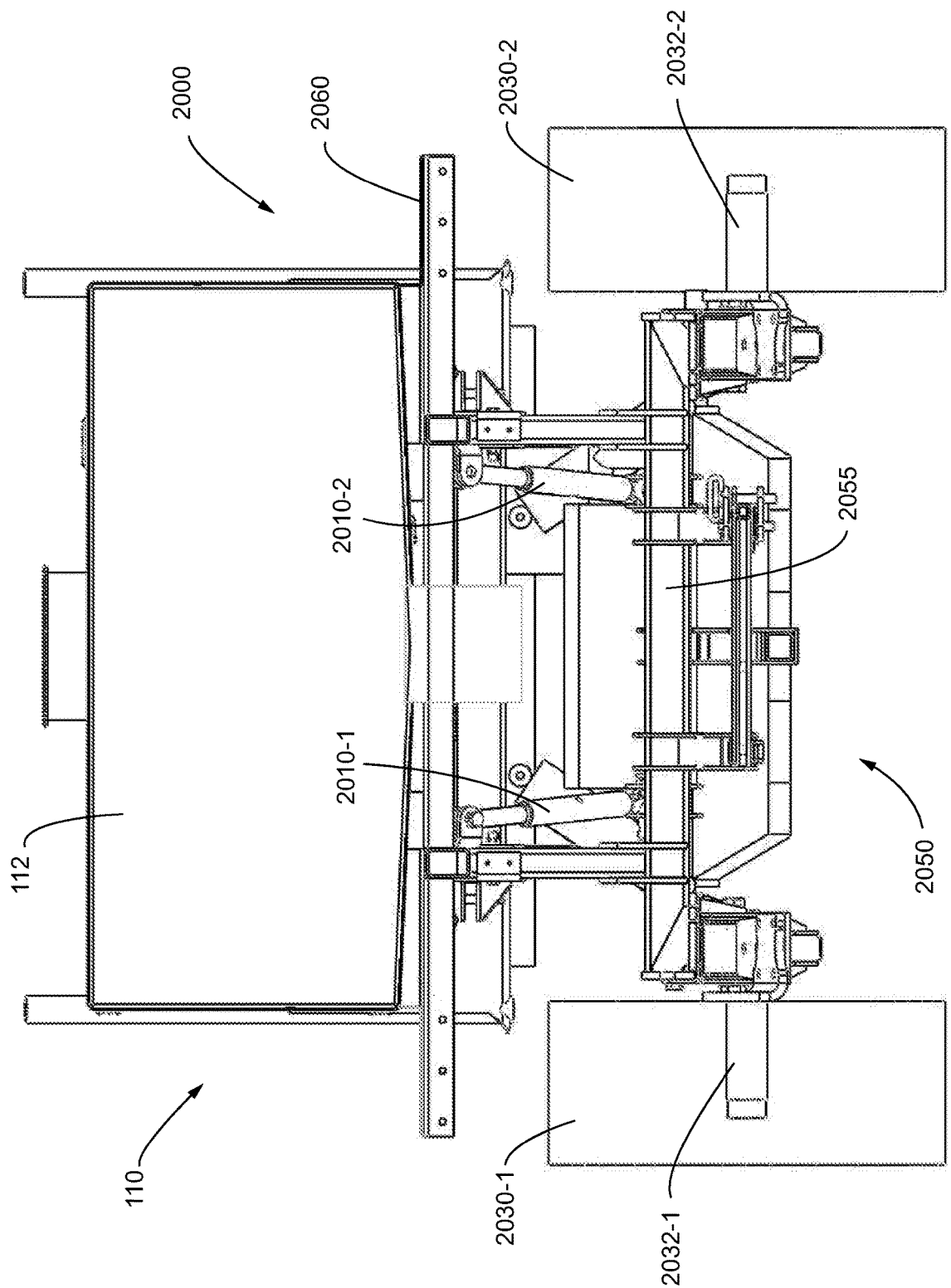
FIG. 22 is a rear elevation view of the utility vehicle and tank support assembly of FIG. 20.
Figure 23:
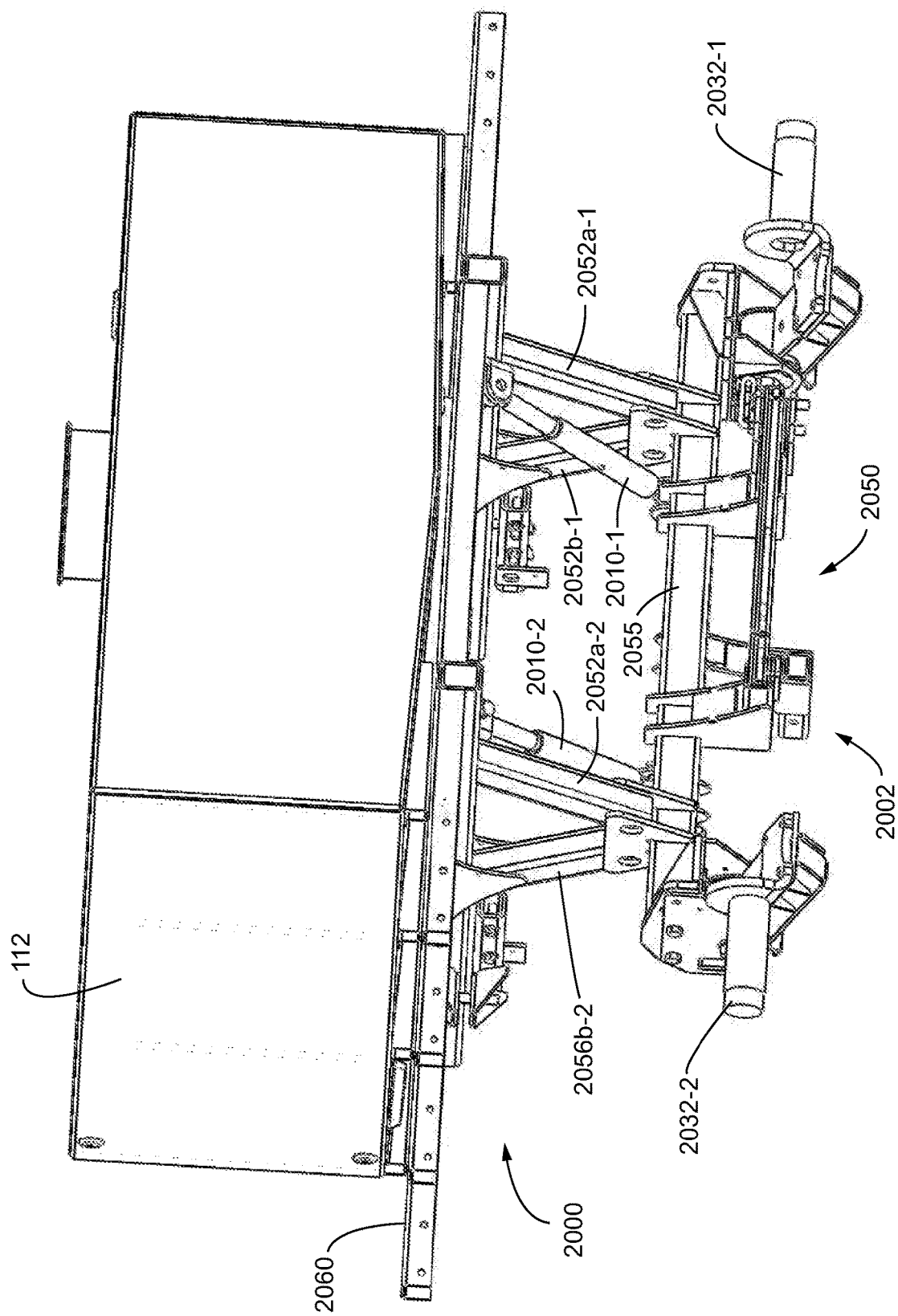
FIG. 23 is a partial perspective view of the tank support assembly of FIG. 20.
Figure 24:
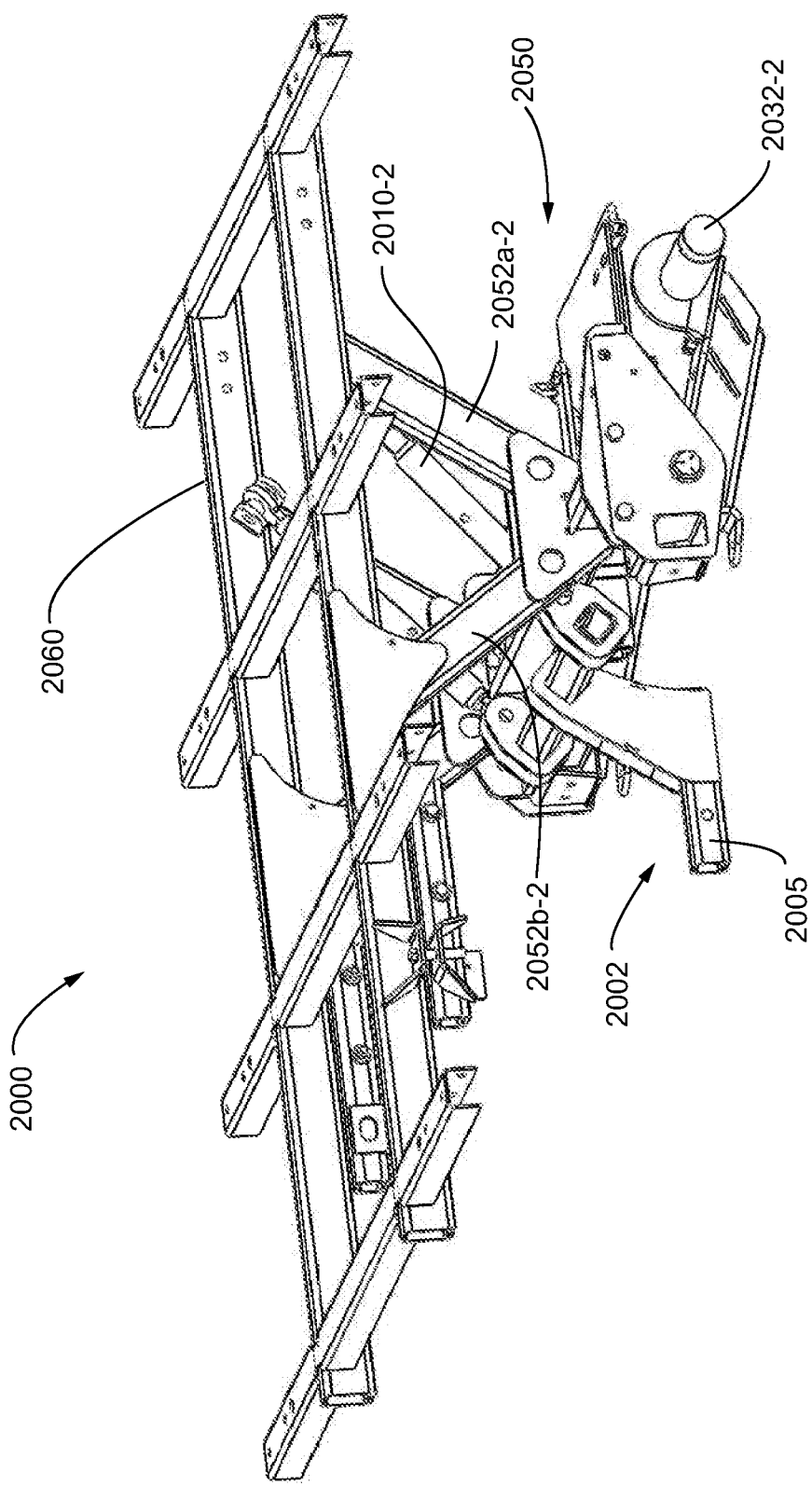
FIG. 24 is another partial perspective view of the tank support assembly of FIG. 20.

Referring to FIGS. 18 and 19, the first coupler portion 1500-1 as well as a the corresponding second coupler portion 1500-2 (which may be supported on the implement 10 and/or in fluid communication with the implement tank 12 of the implement 10) are illustrated in more detail. The first coupler portion 1500-1 includes an inlet 1550 in fluid communication with the delivery hose 1490. The inlet 1550 is in fluid communication with an opening O-1 of the first coupler portion 1500-1, optionally via a check valve 1520. A forward support 1560 surrounds the opening O-1. The forward support 1560 supports one or more magnets 1562, e.g., in a radially arranged configuration as illustrated. The forward support 1560 is spaced apart from a rearward support 1530 by one or more support members 1580. The check valve 1520 is disposed between the forward and rearward supports, and is disposed radially inwardly of support members 1580.

In a mated configuration, the opening O-1 of the first coupler portion 1500-1 is fluidly coupled with an opening O-2 of the second coupler portion 1500-2. The opening O-2 is fluidly coupled to an outlet 1750 which is in turn coupled to the implement tank 12. In some embodiments, the opening O-2 is in fluid communication with outlet 1750 via a check-valve 1720. A guide 1710 is disposed about the opening O-2 and includes a guide surface 1712, such as frustroconical surface, for guiding the first coupler portion 1500-1 toward a metal strike plate 1730. The strike plate 1730 is disposed radially about the opening O-2 and is optionally sized to contact the support 1560 such that magnets 1562 magnetically attach to the strike plate 1730 upon approach.

In some embodiments two second coupler portions 200-2, 1500-2 may be provided on the implement 10 at opposing lateral ends thereof (e.g., lateral ends of toolbar 14) such that an operator may connect the first coupler portions 200-1, 1500-1 on the boom of the MSV 110 to either of the second coupler portions 200-2, 1500-2 in order to optimize operational efficiency, minimize compaction, etc. In such embodiments, both the second coupler portions 200-2, 1500-2 are in fluid communication with the implement tanks 12.

Referring to FIGS. 20-24, an embodiment of a tank support assembly 2000 is shown operably coupled to the MSV 110. It should be appreciated that the supply tank 112 will add considerable weight. Accordingly, it may be desirable for the MSV 110 to have two sets of rear wheels, a forward set of rear wheels 2114-1, 2114-2 and a rearward set of rear wheels 2130-1, 2130-2, and to provide tank support assembly 2000 which distributes at least part of the weight of tank 112 between both sets of rear wheels 2114-1, 2114-2, 2130-1, 2130-2. The set of rear wheels 2030-1, 2030-2 may be existing wheels on the MSV 110, or the set of rear wheels 2030-1, 2030-2 may be added to the MSV 110. For example, if the MSV 110 is based on a conventional utility vehicle such as a John Deere Gator® having only one set of rear wheels 2114-1, 2114-2, the conventional utility vehicle may be retrofitted to include a second set of rear wheels 2030-1, 2030-2. To distribute the weight between both sets of rear wheels 2114-1, 2114-2, 2130-1, 2130-2, load transfer devices 2010-1, 2010-2, such as turnbuckles or other actuators may be provided to shift or more evenly distribute the added weight from the supply tank 112 between both sets of wheels 2114-1, 2114-2, 2130-1, 2130-2.

Thus, in one embodiment, the tank support assembly 2000 includes a forward frame 2002 coupled to a frame 2120 (or other structure) of the MSV 110. For example, a hitch connection 2005 (such as a beam) may be inserted into or otherwise coupled to a receiver 2122 on the frame 2120 and retained to the receiver using a removable fastener (e.g., bolt, pin, etc.).

The tank support assembly 2000 includes a rearward frame 2050 which supports a tank support platform 2060 on which the tank 112 is supported. The rearward frame 2050 is supported on wheels 2030 which are rollingly mounted to the frame by corresponding supports 2032 (e.g., spindles, hubs, etc.).

The turnbuckles or other actuators 2010 couple the forward frame 2002 to the rear frame 2050. The turnbuckles or other actuators 2010 are each pivotally coupled to the forward frame 2002, such as at a cross-support 2055 thereof, at a first end and pivotally coupled to the rear frame 2050, such as to the tank support platform 2060, at a second end. By tightening the turnbuckles or retracting the turnbuckles or other actuators 2010 more of the weight of the tank 112 will be shifted from the forward set of rear wheels 2114-1, 2114-2 to the rearward set of rear wheels 2030-1, 230-2 (e.g., by lifting up on the frame 2120).

The two turnbuckles 2010-1, 2010-2 are disposed on laterally opposing sides of the tank support assembly 2000. The turnbuckles 2010-1, 2010-2 each extend generally rearwardly and upwardly from the forward support frame 2002 to the rear support frame 2050.

A connection 2070 (e.g., bolt or other fastener) limits displacement of the tank 112 relative to the MSV 110; in such embodiments, the connection 2070 allows a limited amount of displacement of the tank 112 relative to the MSV 110 (e.g., during adjustment of turnbuckles 2010).

The cross support 2055 is rigidly coupled to the tank support platform 2060 by a plurality of left-side supports 2052a-1, 20152b-1 and a plurality of right-side supports 2052a-2, 20152b-2. It should be appreciated that alternative configurations of the forward and rear frames 2002, 2050 can be used to support the tank 112.

FIGS. 25-29 illustrate another embodiment of a second coupler portion 2600 which may be used with the either of the embodiments of the first coupler portions 200-1, 1500-1 described above or any other suitable coupling portion. In FIGS. 25-29, the second coupler portion 2600 is illustrated mounted on a planter 2500, such as on an outboard or outer end row unit 2520 thereof, supported on a transversely-extending toolbar 2510 thereof. Alternatively, the second coupler portion 2600 may be mounted on row units adjacent to the outboard row units, such as on the first, second, third, or fourth row units inboard from the end row unit which may allow the operator of the crop input MSV 110 to be positioned laterally to one side of a tractor and/or central support wheels of the implement, where dust or other debris may be generated. A first one of the second coupler portions 2600 may be mounted generally on a first lateral side of the implement and a second one of the second coupler portions may be mounted generally on a second lateral side of the implement; in such embodiments, the operator is enabled to perform resupply operations of the crop input from either side of the implement during operation of the implement.

Figure 25:
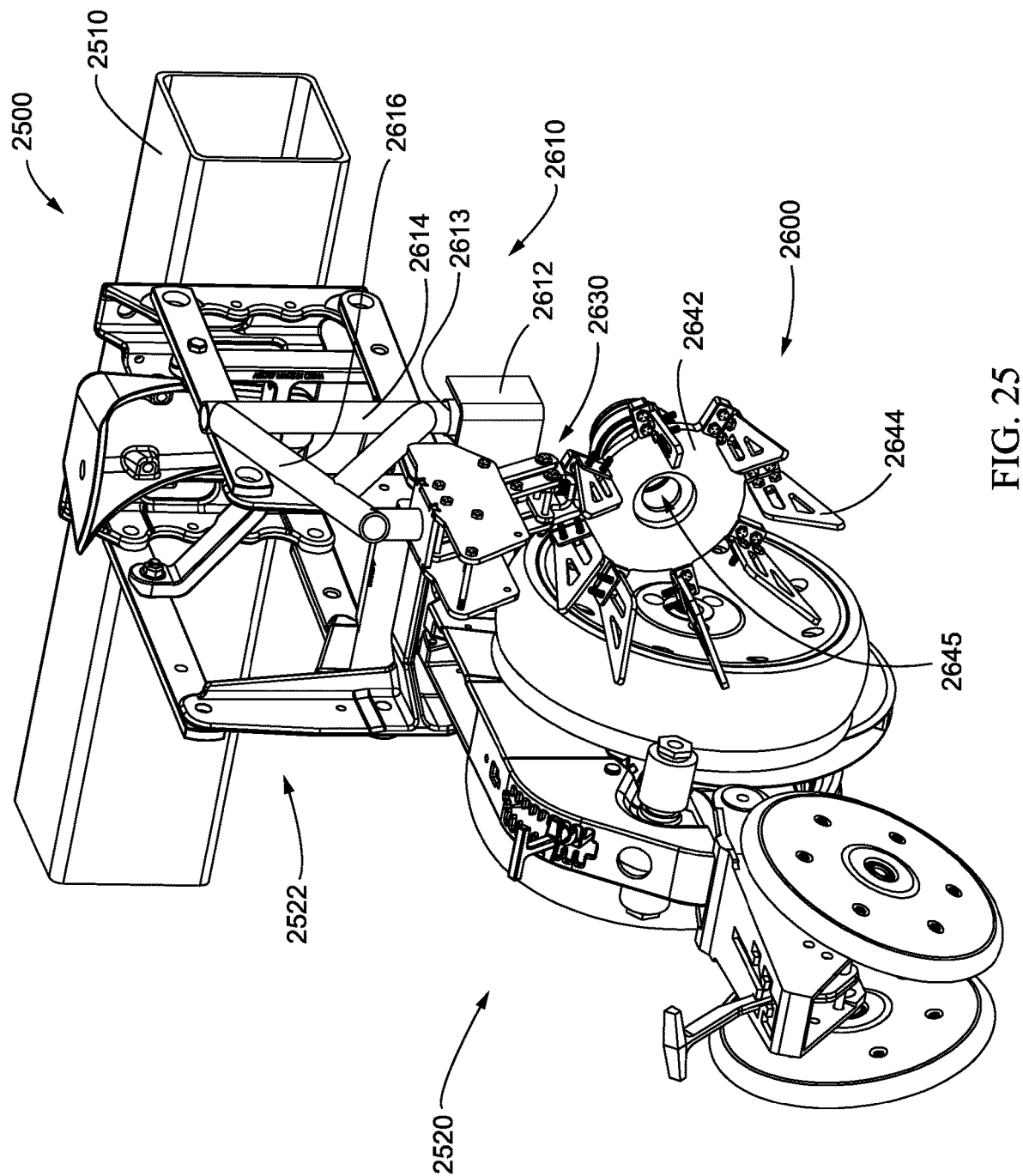
FIG. 25 is a rear perspective view of an embodiment of a coupler supported on an embodiment of a planter row unit.
Figure 26:
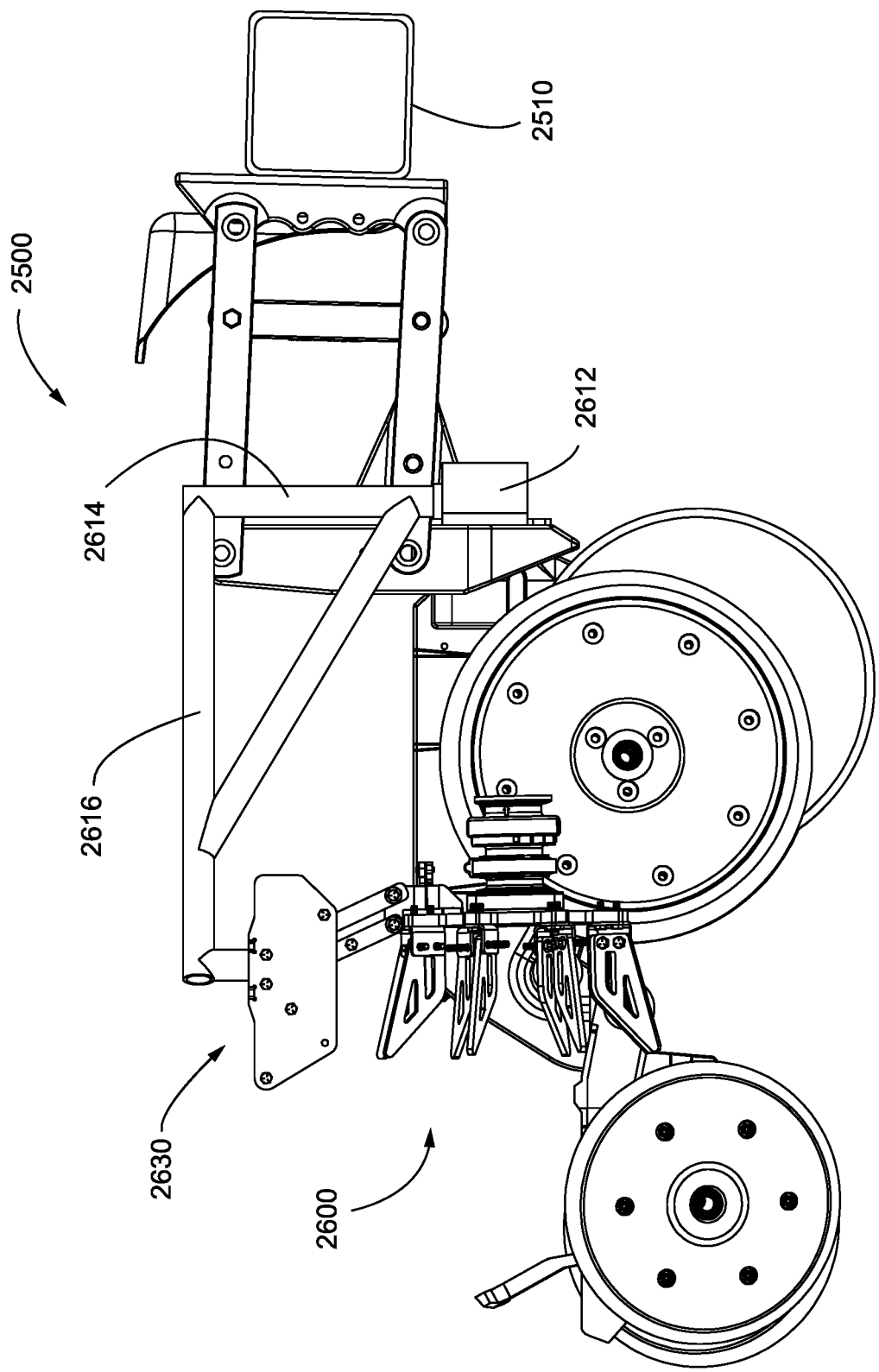
FIG. 26 is a side elevation view of the coupler of FIG. 25 on a planter row unit.
Figure 27:
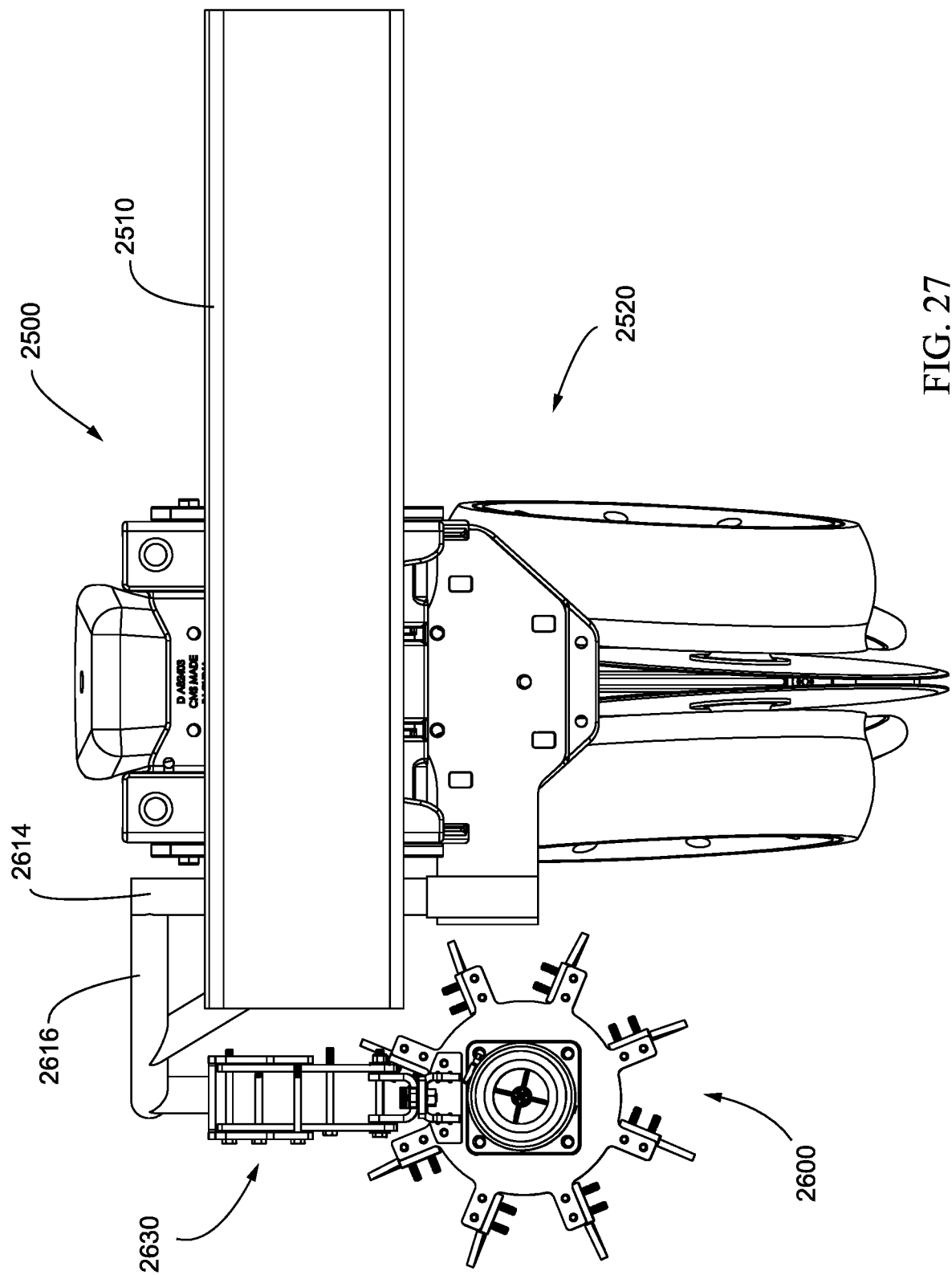
FIG. 27 is a front elevation view of the coupler of FIG. 25 on a planter row unit.

Referring to FIGS. 25-27, the second coupler portion 2600 is shown mounted to a row unit 2520 of a planter implement 2500 with a support assembly 2610 which extends outboard of the row unit 2520. In the illustrated embodiment, the row unit 2520 is the rightmost row unit of the planter and the support assembly 2610 extends to the right of the row unit 2520. The coupler support assembly 2610 includes a support arm 2616 which extends rearwardly and/or in an outboard direction. The support arm 2616 is optionally supported on a frame 2614 which is optionally connected by a coupling 2613 (or other structure) to a bracket 2612. The bracket 2612 is mounted to the row unit 2520 (e.g., to a subframe or other portion thereof).

Continuing to refer to FIGS. 25-27, the coupler support assembly 2610 includes a resilient coupler support 2630 (e.g., on the support arm 2616) such that the second coupler portion 2600 is resiliently supported by the resilient coupler support 2630 and is configured to couple with the boom-mounted coupler portion 200-1, 1500-1 as described above.

Figure 28:
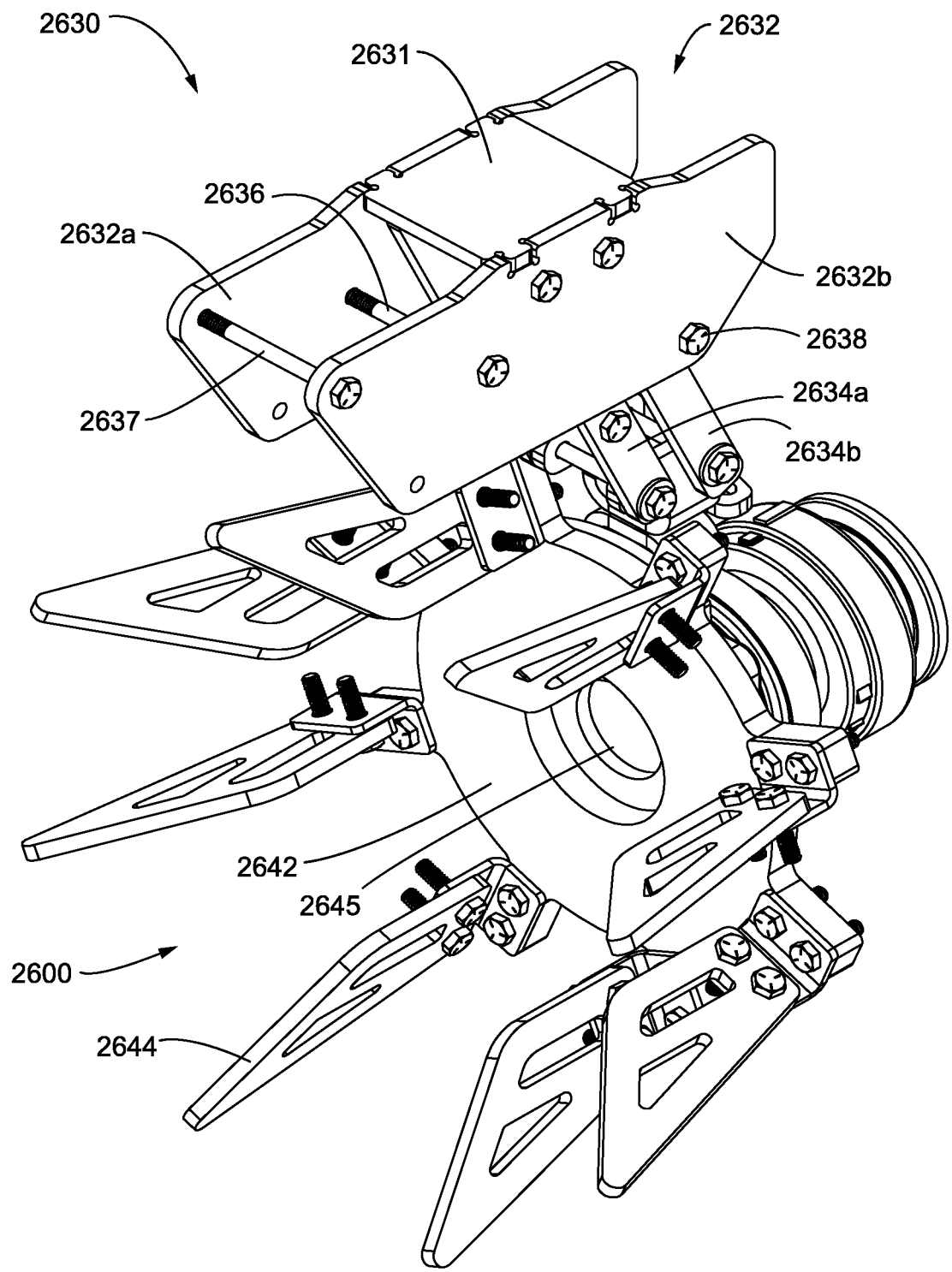
FIG. 28 is a rear perspective view of the coupler of FIG. 25.
Figure 29:
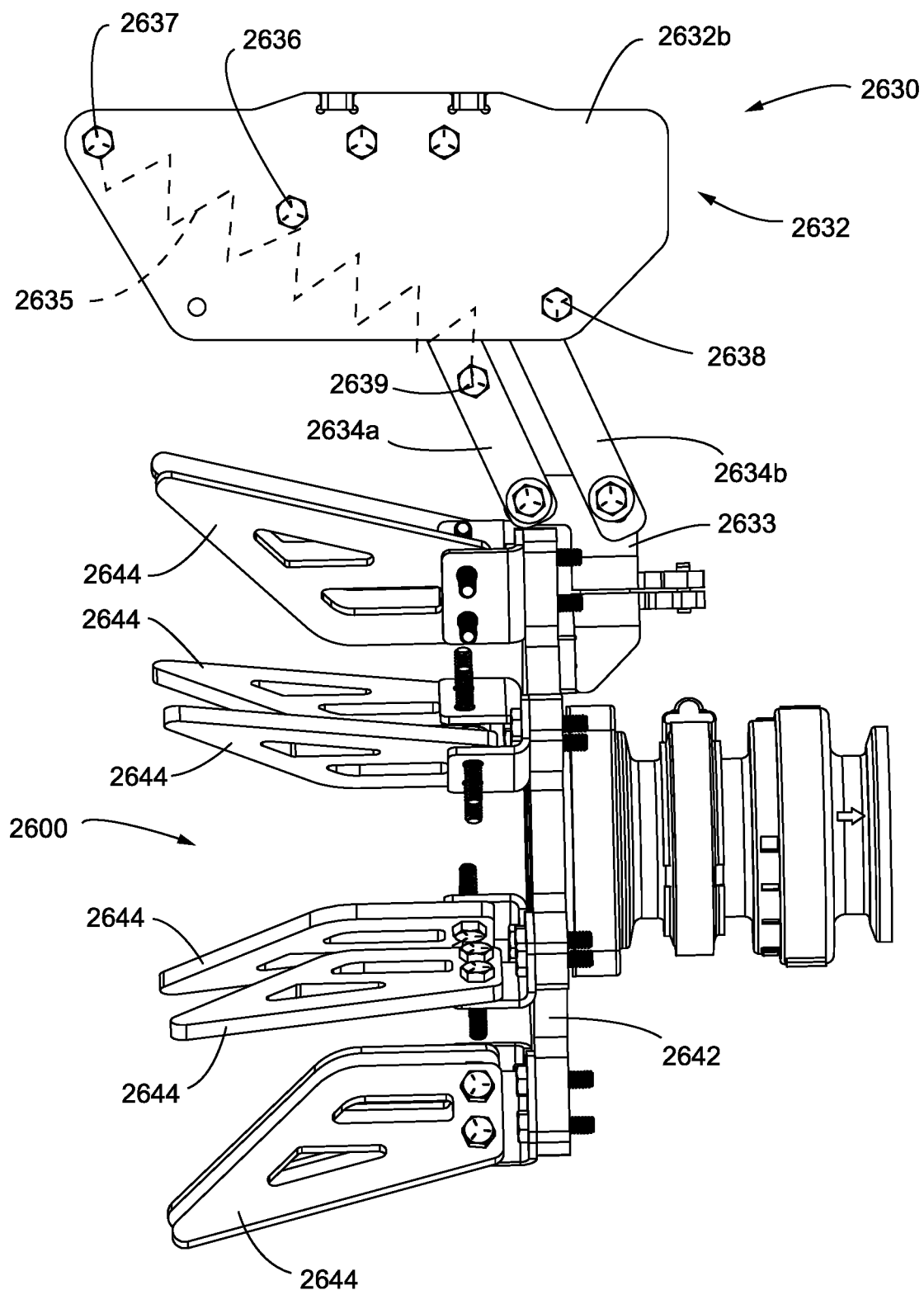
FIG. 29 is a side elevation view of the coupler of FIG. 25.
Figure 30:
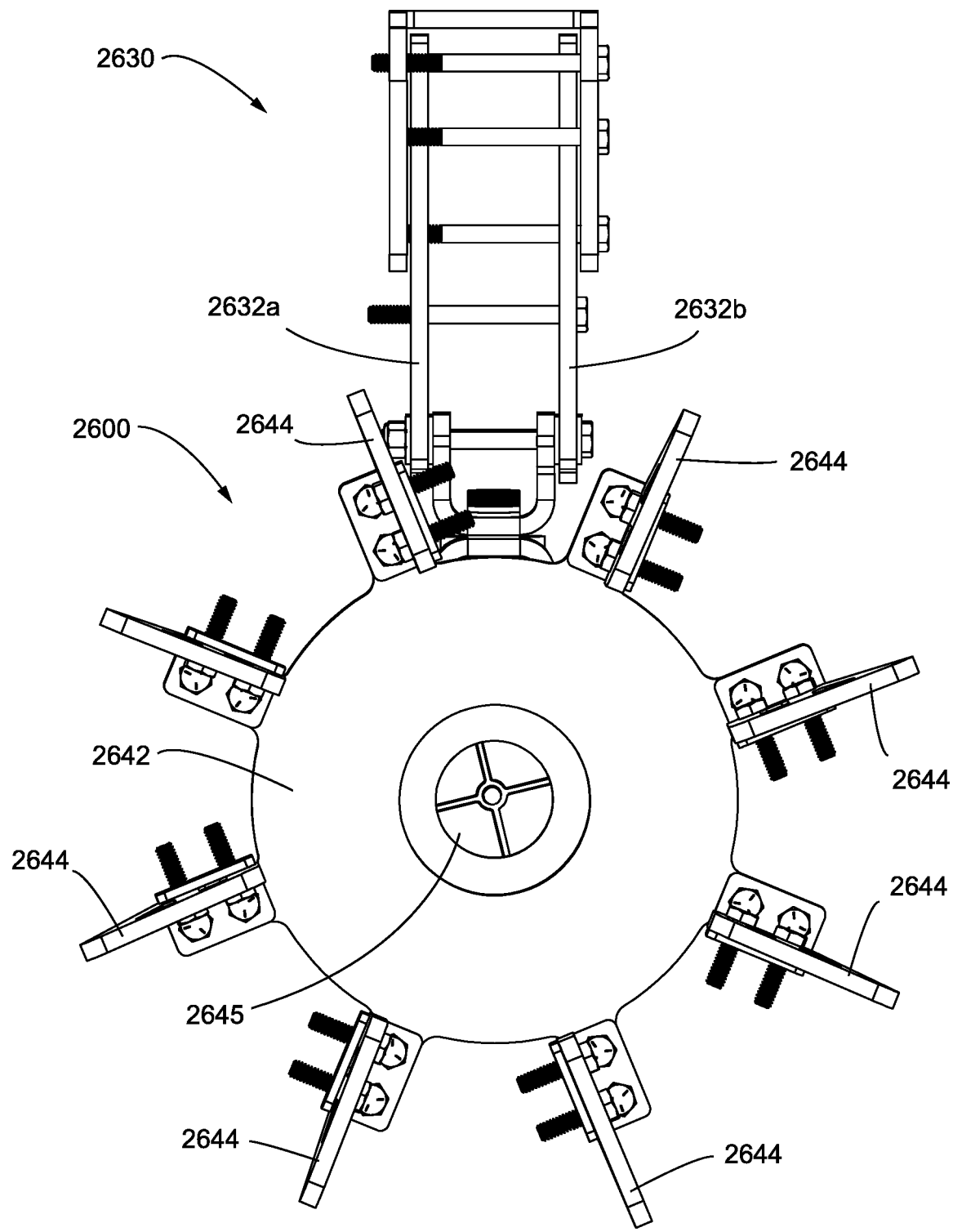
FIG. 30 is a rear elevation view of the coupler of FIG. 25.
Figure 31:
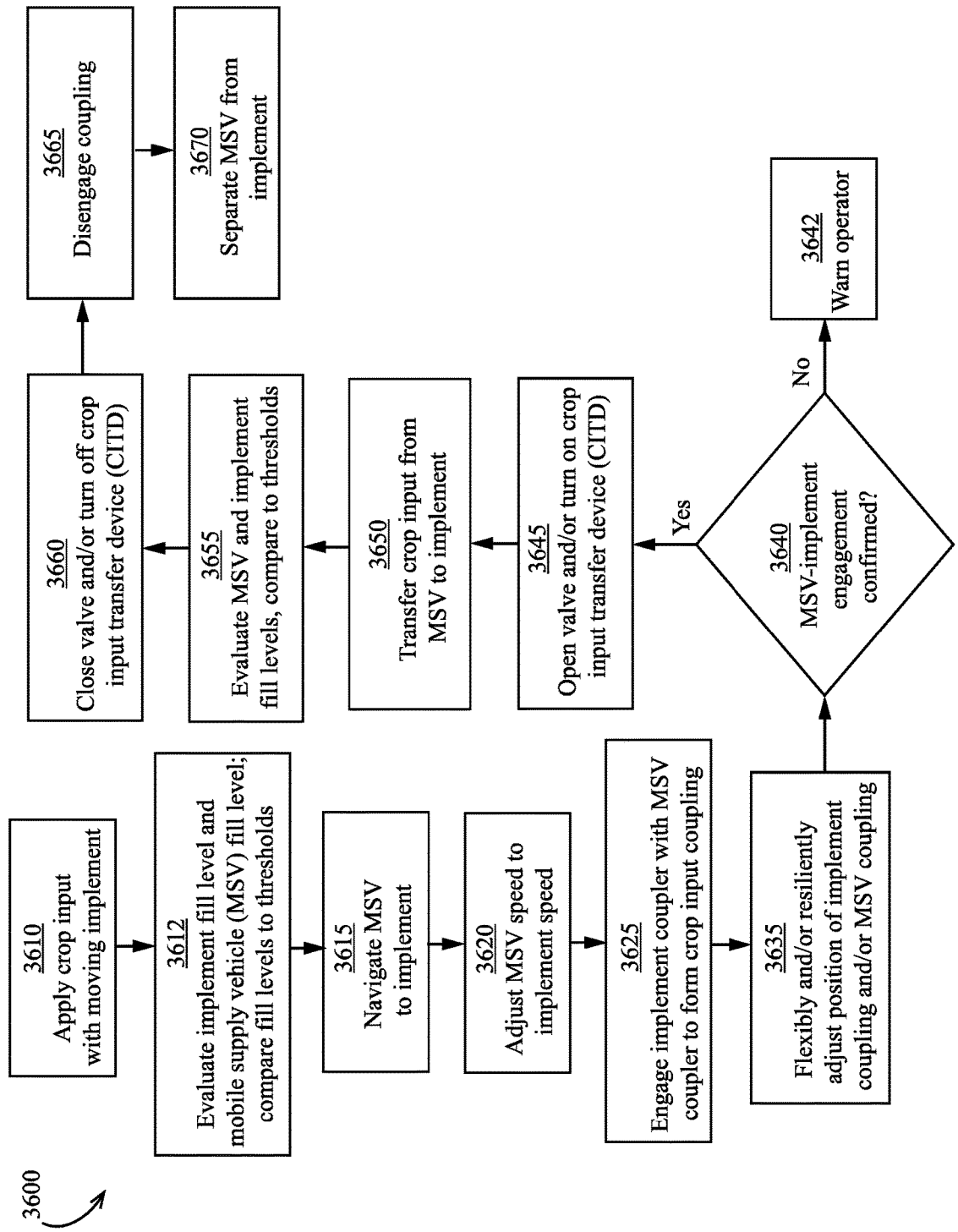
FIG. 31 is a flow chart illustrating one process for a crop input supply system.

Referring to FIGS. 28-30, the resilient coupler support 2630 comprises a bracket 2632 having sidewalls 2632a, 2632b joined by a plate 2631 or other structure. The resilient coupler support 2630 includes a four-bar linkage, comprising a pair of links 2634a and a pair of links 2634b. The links 2634 are pivotally coupled at first ends thereof to the sidewalls 2632 of the resilient coupler support 2630. The links 2634 are pivotally coupled at second ends thereof to an upper bracket 2633 of the second coupler portion 2600. A spring 2635 is secured at one end to the bracket 2632 by a bolt 2637 and to one of the links 2634 by bolt 2639. The spring 2635 resiliently retains the second coupler portion 2600 in a rearward position such that one or more links of the four-bar linkage contact a rearward stop 2636. The rearward stop 2636 comprises a pin, bolt or other element extending between and joining the sidewalls 2632a, 2632b. In the position illustrated in FIG. 30, the second coupler portion 2600 is deflected forward such that the spring 2635 is extended and one or more links of the four-bar linkage contacts a forward stop 2638. The forward stop 2638 comprises a pin, bolt or other element extending between and joining the sidewalls 2632$a$, 2632$b$. In operation, joining a boom-mounted coupler to the second coupler portion 2600 results in deflection of the spring 2635 such that the second coupler portion 2600 is displaced resiliently to one or more positions between the rearward and forward stops 2636, 2638. In some embodiments, the rearward and/or forward stops may be omitted.

The second coupler portion 2600 comprises a mounting plate 2642 having an opening 2645 for receiving crop inputs therethrough. The mounting plate 2642 comprises a metal plate and/or one or more magnetic elements. A plurality of guide fins 2644 are removably mounted by bolts about the circumference of the plate 2642.

Figure 32:
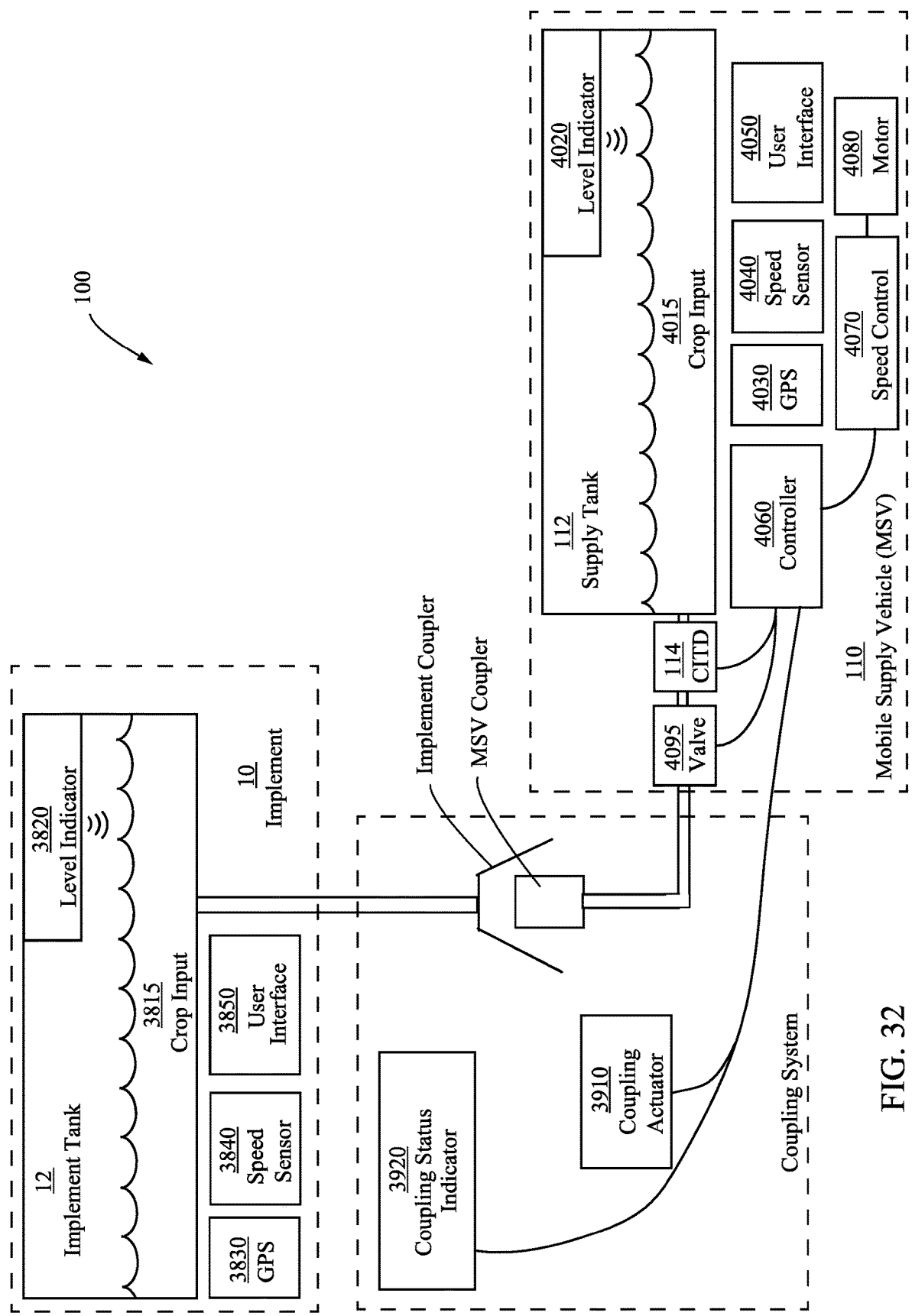
FIG. 32 is a schematic illustration of one embodiment of the a crop input supply system.
Figure 33:
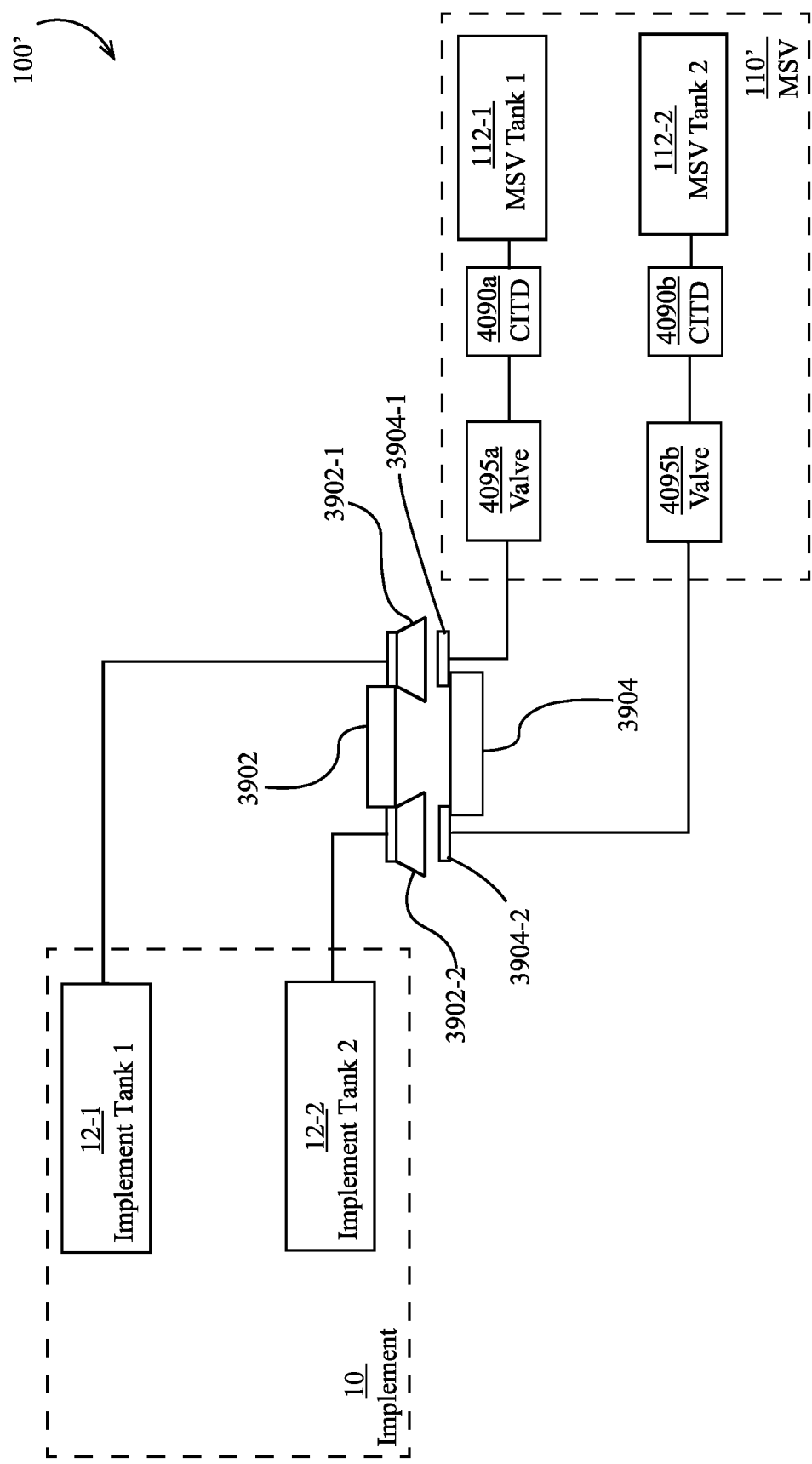
FIG. 33 is a schematic illustration of another embodiment of a crop input supply system.

FIG. 32 schematically illustrates the crop input supply system 100. The system 100 includes a MSV 110 (e.g., a self-powered vehicle such as a utility vehicle, car, truck, sport utility vehicle, etc.) that couples with the agricultural implement 10, such as a planter, drill, fertilizer applicator, herbicide applicator, pesticide applicator, biological applicator, tillage implement, etc., utilizing a boom mounted coupler 200-1, 1500-1 for delivery of crop input (e.g., liquid fertilizer, dry fertilizer, seed, herbicide, pesticide, biological, water, etc.) from the MSV 110 to the implement 10.

The implement 110 includes an implement tank 12 containing crop input 3815 (e.g., liquid fertilizer, dry fertilizer, seed, herbicide, pesticide, biological, water, etc.). An optional level indicator 3820 may be provide to indicate a level of remaining crop input in the implement tank 12. The implement 10 may include a global positioning system ("GPS") 3830 configured to determine and report a location of the implement. The implement 10 may include a speed sensor 3830 (e.g., radar or GPS) configured to determine and report a speed and/or velocity of the implement. The implement 10 may include a user interface 3850 (e.g., a controller, memory, processor, and/or graphical or other user interface) in data communication with the GPS, speed sensor and level indicator of the implement.

The MSV 110 includes a tank 112 containing crop input 4015 (e.g., liquid fertilizer, dry fertilizer, seed, herbicide, pesticide, biological, water, etc.). A level indicator 4020 may be provided to indicate a level of remaining crop input in the tank 112. The MSV 110 may include a GPS 4030 configured to determine and report a location of the MSV 110. The MSV 110 may include a speed sensor 4030 (e.g., radar or GPS) configured to determine and report a speed and/or velocity of the MSV. The supply vehicle 110 may include a user interface 4050 (e.g., a controller, memory, processor, and/or graphical or other user interface) in data communication with the GPS, speed sensor and level indicator of the MSV 110.

The MSV 110 includes a motor 4080 for powering and/or driving the MSV for coupling with the agricultural implement 10 and includes a speed control 4070 for maintaining a selected speed. The speed control 4070 is in data communication with a controller 4060 which is in data communication with the user interface 4050.

The MSV 110 includes the crop input transfer device ("CITD") 114 (e.g., pump, entrainer, conveyor, auger, etc.) to transfer the crop input from the supply tank 112 to the implement tank 12. A valve 4095 or other device may be provided to selectively permit transfer of the crop input from the supply tank 112 to the implement tank 12. The controller 4060 controls an operating parameter of the CITD 114 and/or the valve 4095.

The crop input is transferred from the MSV 110 to the implement via the coupling assemblies 200, 1500, 2600 by maneuvering the coupler of the MSV 110 into a mated configuration with the coupler of the implement 10. In some embodiments, a coupling actuator 3910 is used to actuate the coupling of the implement coupler and/or the MSV coupler between coupled and uncoupled configurations. The coupling actuator 3910 may be in data communication with controller 4060 and/or a controller on the implement 10.

An optional coupling status indicator 3920 may be provided to indicate a status (e.g., coupled or uncoupled) of the coupling assembly. The coupler assembly may be in data communication with and/or may report coupling status to the implement 10 (e.g., the user interface thereof) and/or to the MSV 110 (e.g., the controller 4060 and/or the user interface 4050). In some embodiments, the coupling status indicator 3920 indicates compression of a boom assembly of the MSV 110 or a movement or position of a product supply conduit.

It should be appreciated that various components of the system 100 (e.g., controllers, etc.) can be located and/or supported on the MSV 110, the coupling, and/or the implement according to various embodiments.

Referring to FIG. 36, a process 3600 is illustrated for supplying crop input to an implement. Although the process 3600 is described herein partly with reference to the system 100, the process may be carried out or implemented on other systems and embodiments. At step 3610, the implement 10 applies crop input (e.g., while traveling over a field). At step 3612, the system 100 evaluates the fill level of the implement tank(s) 12 and/or the fill level of the MSV tank 112 and compares one or both fill levels to thresholds, e.g., to determine whether the MSV tank 112 has enough crop input for a filling operation and/or whether the implement tanks 12 require a filling operation. If a filling or resupply operation is possible and/or required, the MSV 110 is navigated (autonomously or by manual operation by an operator) to the implement at step 3615. At step 3620, the MSV 110 speed is adjusted to the implement speed and/or a speed approximately to (e.g., within 5%, 3%, or 1%) the implement speed. The matching step of the MSV speed and implement speed matching may additionally or alternatively be carried out by adjusting the speed of the implement. The MSV-implement speed matching step may be carried out by an operator or by one or more speed controllers. In some embodiments, the MSV-implement speed matching step may be carried out at least partially by consulting the coupling status indicator to determine whether the coupling is engaged (i.e., the first and second coupling portions mating coupled) and/or to determine the position, configuration and/or movement of a component (e.g., product supply hose, boom, etc.).

At step 3625, the implement coupler portion (e.g., 200-2, 1500-2, 2600) is engaged with the MSV coupler portion (e.g., 200-1, 1500-1). The engagement of the coupler portions is carried out by maneuvering the coupler portions into a mated configuration and/or by actuating a latch or other coupling device to couple and/or secure the coupler portions to one another.

While the implement coupler portion and MSV coupler portion are engaged, the position of the implement coupler portion relative to the implement is optionally flexibly and/or resiliently adjusted, e.g., such that minor variations in speed of the MSV 110 and implement 10 do not separate the coupling and/or damage the MSV 110 or implement 10. While the implement and MSV coupler portions are engaged, the position of the MSV coupler portion relative to the MSV 110 is optionally flexibly and/or resiliently adjusted, e.g., such that minor variations in speed of the MSV 110 and implement 10 do not separate the coupling and/or damage the MSV 110 or implement 10.

At step 3640, the MSV-implement coupling engagement is confirmed. This step may be carried out visually by the operator or using a coupling status indicator. If at step 3640 the MSV-implement coupling is not confirmed, then at step 3642 the system 100 optionally warns the operator of the MSV 110 and/or the operator of the implement (e.g., using appropriate user interfaces) that the coupling is not confirmed. If at step 3640 the MSV-implement coupling is confirmed, then at step 3645 a valve in communication with the MSV 110 tank is opened and/or the CITD on the MSV 110 is turned on. Crop input is thus transferred from the MSV 110 to the implement 10 at step 3650.

At step 3655, the system 100 may evaluate the fill levels of the implement tanks 12 to determine whether to terminate the filling or resupply operation, e.g., to determine whether the implement tank 12 is full and/or whether the MSV 110 tank is empty. If the fill level evaluations correspond to a termination of the filling operation, then at step 3660 one or more crop input delivery valves (e.g., on the MSV 110 and/or the implement) is closed and/or the CITD of the MSV 110 is turned off. At step 3665, the first and second coupling portions are decoupled. At step 3670, the MSV 110 is separated from the implement (e.g., by reducing the speed of the MSV 110 relative to the implement).

Referring to FIG. 38, another embodiment of a system 100' is illustrated schematically in which a modified MSV 110' has a plurality of supply tanks 112-1, 112-2. The MSV 110' optionally includes individual valves and CITDs associated with each supply tank 112-1, 112-2. Each supply tank 112-1, 112-2 may be selectively coupled to an associated implement tank 12-1, 12-2 by an associated coupling portion 3902-1, 3902-2 supported and/or linked (e.g., rigidly linked) by a common support 3902 (e.g., bracket, link, etc.). Mating coupling portions 3904-1, 3904-2 may include MSV 110 couplers supported and/or linked (e.g., rigidly linked) by a common support 3904 (e.g., bracket, link, etc.). Alignment, maneuvering and/or coupling of one of the respective mating coupling portions 3902-1, 3904-1 in the system 100' optionally results in alignment, maneuvering, and/or coupling of the other mating coupling portions 3902-2, 3904-2.

In some embodiments and implementations, the methods, systems and apparatus described herein may be used to supply various crop inputs (e.g., liquid crop inputs or seed or other granular products) to the implement. In some such embodiments, the MSV 110 may supply seed to a container on a planter using one of the boom embodiments described herein. In some such embodiments, the coupler portions provided on the implement are optionally in pneumatic communication with a seed container (e.g., central bulk seed hopper) on the planter. In some such embodiments, the MSV is provided with an air-seed entrainer for entraining seed in a flow of air and communicating seed and air through a hose to the coupler on the boom of the utility vehicle. In some implementations, the MSV 110 may receive one of a plurality of seed types from a docking station including a plurality of seed containers (e.g., ProBoxes or other seed containers). The seed containers of the docking station may be supported on a platform having sufficient height to allow the MSV to drive under the seed containers for transfer of seeds to the MSV.

Various modifications to the embodiments and the general principles and features of the apparatus, systems and methods described herein will be readily apparent to those of skill in the art. Thus, the foregoing disclosure is not to be limited to the embodiments of the apparatus, systems and methods described herein and illustrated in the drawing figures, and should be interpreted broadly to include all variations and modifications coming within the scope of the appended claims and their legal equivalents.

The invention claimed is:

1. A crop input transfer system for transferring a crop input to an implement tank supported on an agricultural implement while the agricultural implement is traveling in a forward direction of the travel during field operations and dispensing the crop input, the crop input transfer system comprising:
   a mobile supply vehicle powered independent of the implement, said mobile vehicle having a supply tank holding a crop input supply;
   a boom having a proximal end and a distal end, the proximal end of the boom supported on said mobile supply vehicle;
   a conduit having a proximal end and a distal end, the proximal end of the conduit in communication with the crop input supply, the distal end of the conduit supported by the distal end of the boom;
   a first coupler portion portion mounted to said distal end of said boom via a boom mount, said first coupler portion in communication with said supply tank via said conduit;
   a second coupler portion mounted to said agricultural implement via an implement mount, said second coupler portion in communication with the implement tank, wherein said implement mount is flexible such that said second coupler portion movably displaces relative to said implement;
   whereby, said mobile supply vehicle is adapted to be driven into position relative to the agricultural implement while the agricultural implement continues traveling in the forward direction of travel during field operations, and whereby the first coupler portion supported on the distal end of the boom is adapted to matingly couple in communication with the second coupler portion so as to transfer the crop input supply from the supply tank of the mobile supply vehicle to the implement tank of the agricultural implement without the agricultural implement discontinuing field operations.

2. The crop input transfer system of claim 1, wherein said crop input supply is a liquid product.

3. The crop input transfer system of claim 1, wherein said crop input supply is a granular product.

4. The crop input transfer system of claim 1, wherein said boom moves between a retracted position and an extended position, wherein in said extended position said boom extends a distance further forward of said supply vehicle than when said boom is in said retracted position.

5. The crop input transfer system of claim 4, wherein said boom includes a first section that extends forward of a second section when said boom moves from said retracted position to said extended position.

6. The crop input transfer system of claim 4, wherein said boom pivots vertically about a horizontal axis when moving between said retracted position and said extended position.

7. The crop input transfer system of claim 1, wherein said implement mount includes a parallel linkage.

8. The crop input transfer system of claim 1, wherein said boom mount is flexible such that said first coupler portion movably displaces relative to said boom.

9. The crop input transfer system of claim 1, wherein said first and second coupler portions matingly couple magnetically.

10. The crop input transfer system of claim 1, wherein said first and second coupler portions matingly couple mechanically.

11. The crop input transfer system of claim 1, further comprising a level indicator configured to indicate a level of the crop input in the implement tank.

12. The crop input transfer system of claim 1, further comprising a level indicator configured to indicate a level of said crop input supply in said supply tank.

13. The crop input transfer system of claim 1, wherein said supply vehicle further comprises a speed control configured to maintain a selected travel speed of said supply vehicle.

14. A method of transferring a crop input to an implement tank disposed on the implement for resupplying the implement tank with the crop input while the implement is on-the-go traversing a field in a forward direction of travel dispensing the crop input from the implement tank onto the field, the method comprising:
    navigating a mobile supply vehicle toward the implement as the implement is on-the-go traversing the field in the forward direction of travel dispensing the crop input from the implement tank onto the field, said mobile supply vehicle having a supply tank holding a crop input supply, said mobile supply vehicle further having a boom supporting a delivery hose, a first end of the delivery hose in communication with a first coupler portion disposed at a distal end of the boom, a second end of the delivery hose in communication with the supply tank;
    approximately matching a speed of said mobile supply vehicle to a speed of the implement while the implement is on-the-go traversing the field in the forward direction of travel dispensing the crop input from the implement tank onto the field;
    matingly coupling said first coupling portion disposed at the distal end of said boom with a second coupling portion mounted on the implement while the implement is on-the-go traversing the field in the forward direction of travel dispensing the crop input from the implement tank onto the field, said second coupling portion in communication with the implement tank; and
    transferring an amount of said crop input supply from said supply tank to said implement tank via the matingly coupled first and second coupling portions while the implement is on-the-go traversing the field in the forward direction of travel dispensing the crop input from the implement tank onto the field;
    after transferring the amount of said crop input supply from said supply tank to said implement tank, decoupling the matingly coupled first and second coupling portions while the implement is on-the-go traversing the field in the forward direction of travel dispensing the crop input from the implement tank onto the field, whereby the implement tank is resupplied with the crop input supply without the implement stopping.

15. The method of claim 14, further comprising:
    moving said boom from a retracted position to an extended position before matingly coupling said first coupling portion with said second coupling portion, wherein in said extended position said boom extends a distance further forward of said mobile supply vehicle than when said boom is in said retracted position.

16. The method of claim 15, wherein said boom includes a first section that extends forward of a second section when said boom moves from said retracted position to said extended position.

17. The method of claim 15, wherein said boom pivots vertically about a horizontal axis when moving between said retracted position and said extended position.

18. The method of claim 14, wherein said step of matingly coupling said first coupling portion with said second coupling portion includes magnetically coupling said first coupling portion with said second coupling portion.

19. The method of claim 14, wherein said step of matingly coupling said first coupling portion with said second coupling portion includes mechanically coupling said first coupling portion with said second coupling portion.

20. The method of claim 14, further comprising:
    determining a level of the crop input within the implement tank.

21. The method of claim 14, further comprising:
    determining a level of said crop input supply in said supply tank.

22. The method of claim 20, wherein the step of decoupling the matingly coupled first and second coupling portions is performed when the implement tank reaches a predetermined fill level with said crop input supply transferred from said supply tank to said implement tank.

23. The method of claim 21, wherein the step of decoupling the matingly coupled first and second coupling portions is performed when said supply tank reaches a predetermined low level of said crop input supply within said supply tank.

24. The method of claim 14, further comprising:
    confirming said first and second coupler portions are matingly coupled; and
    commencing transfer of said crop input supply from said supply tank to the implement tank only upon confirmation that said first and second coupler portions are matingly coupled.

* * * * *

UNITED STATES PATENT AND TRADEMARK OFFICE
CERTIFICATE OF CORRECTION

| | | |
|---|---|---|
| PATENT NO. | : 11,718,489 B2 | Page 1 of 1 |
| APPLICATION NO. | : 16/626045 | |
| DATED | : August 8, 2023 | |
| INVENTOR(S) | : Jonathan T. Welte and Nowell Moore | |

It is certified that error appears in the above-identified patent and that said Letters Patent is hereby corrected as shown below:

In the Claims

In Claim 1, Column 12, Line 11 (fourth line of Claim 1) -- before the word "travel", delete the word "the".

In Claim 1, Column 12, Line 25 -- before the word "mounted", delete the duplicate word "portion".

Signed and Sealed this
Ninth Day of July, 2024

*Katherine Kelly Vidal*

Katherine Kelly Vidal
*Director of the United States Patent and Trademark Office*